(12) United States Patent
Hanes et al.

(10) Patent No.: US 12,171,362 B2
(45) Date of Patent: *Dec. 24, 2024

(54) BEVERAGE MAKER

(71) Applicant: Hamilton Beach Brands, Inc., Glen Allen, VA (US)

(72) Inventors: Adam Hanes, Glen Allen, VA (US); Yongwu Chen, Shenzhen (CN)

(73) Assignee: Hamilton Beach Brands, Inc., Glen Allen, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,507

(22) Filed: Jan. 27, 2023

(65) Prior Publication Data
US 2023/0172391 A1 Jun. 8, 2023

Related U.S. Application Data

(60) Continuation of application No. 17/366,877, filed on Jul. 2, 2021, which is a continuation-in-part of application No. 15/984,698, filed on May 21, 2018, now Pat. No. 11,083,331, which is a division of application No. 15/010,649, filed on Jan. 29, 2016, now Pat. No. 9,980,602, which is a continuation-in-part of application No. 14/613,682, filed on Feb. 4, 2015, now Pat. No. 9,585,513.

(51) Int. Cl.
*A47J 31/36* (2006.01)
*A47J 31/32* (2006.01)
*A47J 31/40* (2006.01)
*A47J 31/46* (2006.01)
*A47J 31/56* (2006.01)
*A47J 31/34* (2006.01)

(52) U.S. Cl.
CPC .............. *A47J 31/56* (2013.01); *A47J 31/32* (2013.01); *A47J 31/3628* (2013.01); *A47J 31/3676* (2013.01); *A47J 31/407* (2013.01); *A47J 31/465* (2013.01); *A47J 31/34* (2013.01); *A47J 31/36* (2013.01); *A47J 31/3623* (2013.01)

(58) Field of Classification Search
CPC .. A47J 31/32; A47J 31/34; A47J 31/36; A47J 31/3623; A47J 31/3628
USPC ........................................... 99/289 R, 302 R
See application file for complete search history.

(56) References Cited

U.S. PATENT DOCUMENTS

| | | | | |
|---|---|---|---|---|
| 8,180,204 B2 * | 5/2012 | Glucksman | ......... | A47J 31/4407 392/328 |
| 2013/0236618 A1 * | 9/2013 | Tinkler | ................... | A47J 31/32 426/431 |

* cited by examiner

*Primary Examiner* — Reginald Alexander
(74) *Attorney, Agent, or Firm* — Alexander D. Raring

(57) ABSTRACT

A beverage maker includes a body and a cover movably attached to the body. The body includes therein (among other components), a hot liquid generator (HLG) having a tank, an inlet for receiving liquid into the tank and an outlet, at least one heater in thermal communication with the liquid in the HLG tank, and a discharge port in fluid communication with the outlet of the HLG for discharge of the liquid. The cover is movably attached to the body between a closed position and an open position. At least one valve permits the discharge of the liquid via the discharge port in a closed position of the cover. The at least one valve is mechanically actuated by the cover in the open position of the cover to substantially prevent the discharge of the liquid via the discharge port.

18 Claims, 22 Drawing Sheets

BEVERAGE MAKER

CROSS REFERENCE TO RELATED APPLICATIONS

This application is a continuation of co-pending U.S. application Ser. No. 17/366,877, filed Jul. 2, 2021, which is a continuation-in-part of U.S. application Ser. No. 15/984,698, filed May 21, 2018, now U.S. Pat. No. 11,083,331, which is a divisional of U.S. application Ser. No. 15/010,649, filed Jan. 29, 2016, now U.S. Pat. No. 9,980,602, which is a continuation-in-part of application Ser. No. 14/613,682, now U.S. Pat. No. 9,585,513, filed Mar. 7, 2017, the disclosures of which are incorporated herein by reference in their entirety.

BACKGROUND OF THE DISCLOSURE

The present disclosure is generally directed to a beverage maker, and more particularly, to a steam or pump operated beverage maker.

Typical hot beverage makers are generally steam operated or pump operated. One advantage of pump operated beverage makers is that the internal pressure of the system can be better regulated by the beverage maker's control system. Conventional air pump operated beverage makers, however, may continue dispensing a heated beverage if a user opens the beverage maker's lid/cover while the air pump is running, which may lead to injury, e.g., burn injury, from heated liquid being sprayed onto the user.

Some manufacturers have attempted to address this potentially hazardous situation by employing a solenoid that electronically opens and closes a pressure release valve in the beverage maker. The solenoid is programmed to open the pressure release valve whenever the lid of the beverage maker is opened, to quickly release the pressure within the system, thereby preventing further dispensing of the heated beverage or a spray of hot liquid. One drawback of such a setup, however, is that if the electronics of the beverage maker are compromised, or malfunction, in any manner, the solenoid may not properly operate to electronically open the pressure release valve. Accordingly, the beverage maker may not stop dispensing the heated beverage as intended and spray of hot liquid may occur. Another drawback of such a setup is that a solenoid is a relatively expensive component, the cost of which is ultimately imparted onto the consumer.

Therefore, it would be advantageous to employ a more cost effective, mechanical solution for releasing the pressure within the system, unrelated to the beverage maker's electronic circuitry, for preventing further dispensing of a heated beverage or accidental spray of the hot liquid if the lid of the beverage maker is opened during operation of the air pump.

BRIEF SUMMARY OF THE DISCLOSURE

Briefly stated, one aspect of the present disclosure is directed to a beverage maker. The beverage maker comprises a body, a hot liquid generator (HLG) positioned within the body and having a tank, an inlet for receiving liquid into the tank and an outlet, at least one heater in thermal communication with the liquid in the HLG tank, and a discharge port in fluid communication with the outlet of the HLG for discharge of the liquid. A cover is movably attached to the body between a closed position and an open position. At least one valve permits the discharge of the liquid via the discharge port in a closed position of the cover, and the at least one valve is mechanically actuated by the cover in the open position of the cover to substantially prevent the discharge of the liquid via the discharge port.

Another aspect of the present disclosure is directed to a beverage maker comprising a body, a hot liquid generator (HLG) positioned within the body and having a tank, an inlet for receiving liquid into the tank and a first outlet, at least one heater in thermal communication with the liquid in the HLG tank, and a discharge port in fluid communication with the first outlet of the HLG for discharge of the liquid. A cover is movably attached to the body between a closed position and an open position. A pressure release valve is in continuous fluid communication with a second outlet of the HLG, the pressure release valve comprising a valve seat mounted to the cover and a complementary valve stem mounted to the body. The valve stem sealingly engages the valve seat in the closed position of the cover, thereby preventing release of pressure within the tank therethrough. Movement of the cover from the closed position to the open position mechanically disengages the valve stem from the valve seat, thereby releasing pressure within the tank therethrough.

Another aspect of the present disclosure is directed to a beverage maker comprising a body, a hot liquid generator (HLG) positioned within the body and having a tank, an inlet for receiving liquid into the tank and a first outlet, at least one heater in thermal communication with the liquid in the HLG tank and a discharge port in fluid communication with the first outlet of the HLG for discharge of the liquid. A cover is movably attached to the body between a closed position and an open position. A pressure release valve is mounted to the cover and in fluid communication with a second outlet of the HLG, the pressure release valve comprising a valve stem, a valve seat, and a biasing member biasing the valve stem into disengagement from the valve seat. The body engages and mechanically actuates the valve stem into sealing engagement with the valve seat in the closed position of the cover, against the bias of the biasing member, thereby preventing release of pressure within the tank therethrough. The body is disengaged from the pressure release valve in the open position of the cover, such that the biasing member maintains the valve stem disengaged from the valve seat, thereby releasing pressure within the tank therethrough.

Another aspect of the present disclosure is directed to a beverage maker comprising a body, a hot liquid generator (HLG) positioned within the body and having a tank, an inlet for receiving liquid into the tank and an outlet, at least one heater in thermal communication with the liquid in the HLG tank, and a discharge port in fluid communication with the first outlet of the HLG for discharge of the liquid. A flexible tube fluidly communicates the HLG outlet and the discharge port and a cover is movably attached to the body between a closed position and an open position. A pinch valve is mounted onto the flexible tube, the pinch valve including a biasing member biasing the pinch valve into a pinching position, pinching the flexible tube and obstructing fluid flow from the HLG outlet to the discharge port. The biasing member is mechanically engaged and actuated by the body into a release position in the closed position of the cover, permitting fluid flow from the HLG outlet to the discharge port. The biasing member returns the pinch valve to the pinching position in the open position of the cover.

Another aspect of the present disclosure is directed to a beverage maker comprising a body, a hot liquid generator (HLG) positioned within the body and having a tank, an inlet for receiving liquid into the tank and an outlet, at least one heater in thermal communication with the liquid in the HLG tank, and a discharge port in fluid communication with the first outlet of the HLG for discharge of the liquid. A cover is movably attached to the body between a closed position and an open position. A diverter valve comprises an inlet in fluid communication with the HLG outlet, a first outlet in fluid communication with the discharge port, a second outlet in fluid communication with a separate bypass port, and a sealing member mechanically linked with the cover. The sealing member is movable between a bypass position, sealingly engaging the diverter valve first outlet such that the diverter valve inlet is in fluid communication with the diverter valve second outlet, and a discharge position, sealingly engaging the diverter valve second outlet such that the diverter valve inlet is in fluid communication with the diverter valve first outlet.

A further aspect of embodiments of the invention is a beverage maker comprising: a housing; a hot liquid generator (HLG) positioned within the housing and having a tank and a conduit having a main portion and first and second branches; a heater positioned to heat liquid in the HLG; a discharge port in fluid communication with the first branch of the HLG for discharge of liquid therefrom; a bypass port in fluid communication with the second branch of the HLG; a cover movably attached to the housing between a closed position and an open position; and a valve arrangement. The valve arrangement comprises: a pressure relief valve positioned on the second branch in fluid communication with the bypass port; and a sealing member operatively linked with the cover and positioned on the first branch of the conduit, the sealing member being movable between a discharge position, wherein the sealing member is positioned to enable fluid communication between the main portion of the conduit and the discharge port, and a bypass position, in which the sealing member is positioned to seal the first branch of the conduit and interrupt fluid communication between the main portion of the conduit and the discharge port, such that fluid is directed toward the pressure-relief valve on the second branch.

A still further aspect of embodiments of the invention is a beverage maker comprising: a housing; a hot liquid generator (HLG) positioned within the housing and having a tank and a conduit having a main portion and first and second branches, wherein a fitting is connected with the main portion, the first branch and the second branch of the conduit; a heater positioned to heat liquid in the HLG; a discharge port in fluid communication with the first branch of the HLG for discharge of liquid therefrom; a bypass port in fluid communication with the second branch of the HLG; a cover movably attached to the housing between a closed position and an open position; and a valve arrangement. The valve arrangement comprises: a pressure relief valve positioned on the second branch in fluid communication with the bypass port; and a piston valve operatively linked with the cover and positioned on the first branch of the conduit, the piston valve having a piston movable between a discharge position, wherein the piston is positioned to enable fluid communication between the main portion of the conduit and the discharge port, and a bypass position, in which the piston is positioned to seal the first branch and interrupt fluid communication between the main portion of the conduit and the discharge port, such that fluid is directed toward the pressure-relief valve on the second branch.

BRIEF DESCRIPTION OF THE DRAWINGS

The foregoing summary, as well as the following detailed description of the disclosure, will be better understood when read in conjunction with the appended drawings. For the purpose of illustrating the disclosure, there is shown in the drawings embodiments of a beverage maker which are presently preferred. It should be understood, however, that the disclosure is not limited to the precise arrangements and instrumentalities shown. In the drawings.

DESCRIPTION OF THE DISCLOSURE

Figure 1:
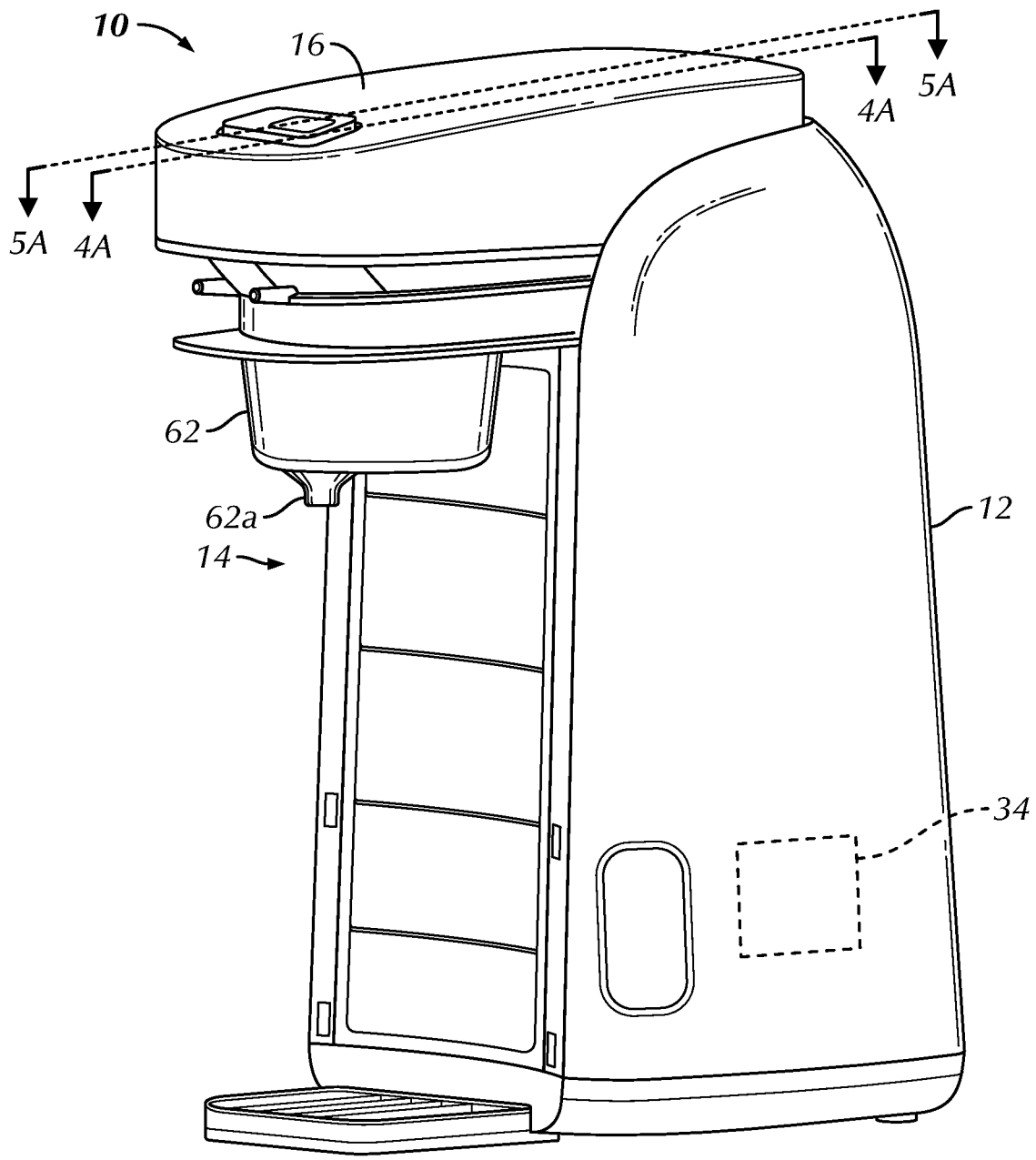
FIG. 1 is a top, front perspective view of a beverage maker according to a first embodiment of the disclosure.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the beverage maker, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the disclosure, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to the drawings in detail, wherein like numerals indicate like elements throughout, there is shown in FIGS. 1-7 a beverage maker, generally designated 10, in accordance with a preferred embodiment of the present disclosure. The beverage maker 10 is intended or designed for preparing a beverage from foodstuff (not shown) to be consumed by a user. The foodstuff is preferably inserted into at least a portion of the beverage maker 10 in a dry or generally dry state. Following completion of preparation of the beverage, any moist or saturated foodstuff remaining in the beverage maker 10 is preferably removed and either recycled or discarded.

Although the beverage maker 10 may be generally referred to as a "coffeemaker," wherein coffee is prepared from coffee grounds, the beverage maker is preferably capable of making other beverages from extractable/infusible foodstuff as well, such as tea leaves, hot chocolate powder, soup ingredients, oatmeal, and the like. Thus, the beverage maker 10 is versatile because it may be used to create and/or prepare any one of a variety of different types of beverages from a variety of different types of foodstuff. More specifically, the beverage maker 10 preferably heats a liquid, such as water, to a sufficient temperature to be combined with or poured over the foodstuff to create a hot beverage (or even a cold beverage if poured over ice).

The beverage maker 10 of the preferred embodiment prepares a beverage of a single-serving size (which is up to approximately sixteen ounces of prepared beverage), although it is envisioned that, in alternative embodiments, the beverage maker 10 may be operative with smaller or larger serving sizes (e.g., a pot or carafe) as well. Depressing an on/off button (not shown) of the beverage maker 10 preferably initiates an operating cycle, and subsequent depressing of the on/off button preferably ends the operating cycle. The phrase "operating cycle" is broadly defined herein as a period of time when the beverage maker 10 is first activated to when the beverage is fully prepared and the beverage maker 10 is deactivated either by itself or by a user depressing the on/off button. As should be understood, the beverage maker 10 is not limited to including solely an on/off button. For example, additional buttons, knobs, switches, levers (not shown) and/or a control panel may be added to the beverage maker 10 to allow the user increased control over the functionality and/or operation of the beverage maker 10.

The beverage maker 10 includes a housing or body 12 for enclosing and protecting internal components of the beverage maker 10, as described in detail below. The body 12 and/or any components thereof may be constructed from any polymer, metal or other suitable material or combinations of materials. For example, an injection molded acrylonitrile butadiene styrene (ABS) material could be employed, but the body 12 may be constructed of nearly any generally rigid material that is able to take on the general shape of the body 12 and perform the functionality of the body 12 described herein. The body 12 may be generally or completely or partially opaque, translucent or transparent. The body 12 includes a recess 14 that is sized, shaped and/or configured to receive and/or support at least a portion of cup, pot, carafe, travel mug, vessel or other receptacle (not shown) for receiving a beverage that exits the beverage maker 10. The beverage preferably flows, drips or otherwise accumulates in the receptacle, which is subsequently removed from the recess 14 by a user prior for consumption of the beverage.

Figure 7:
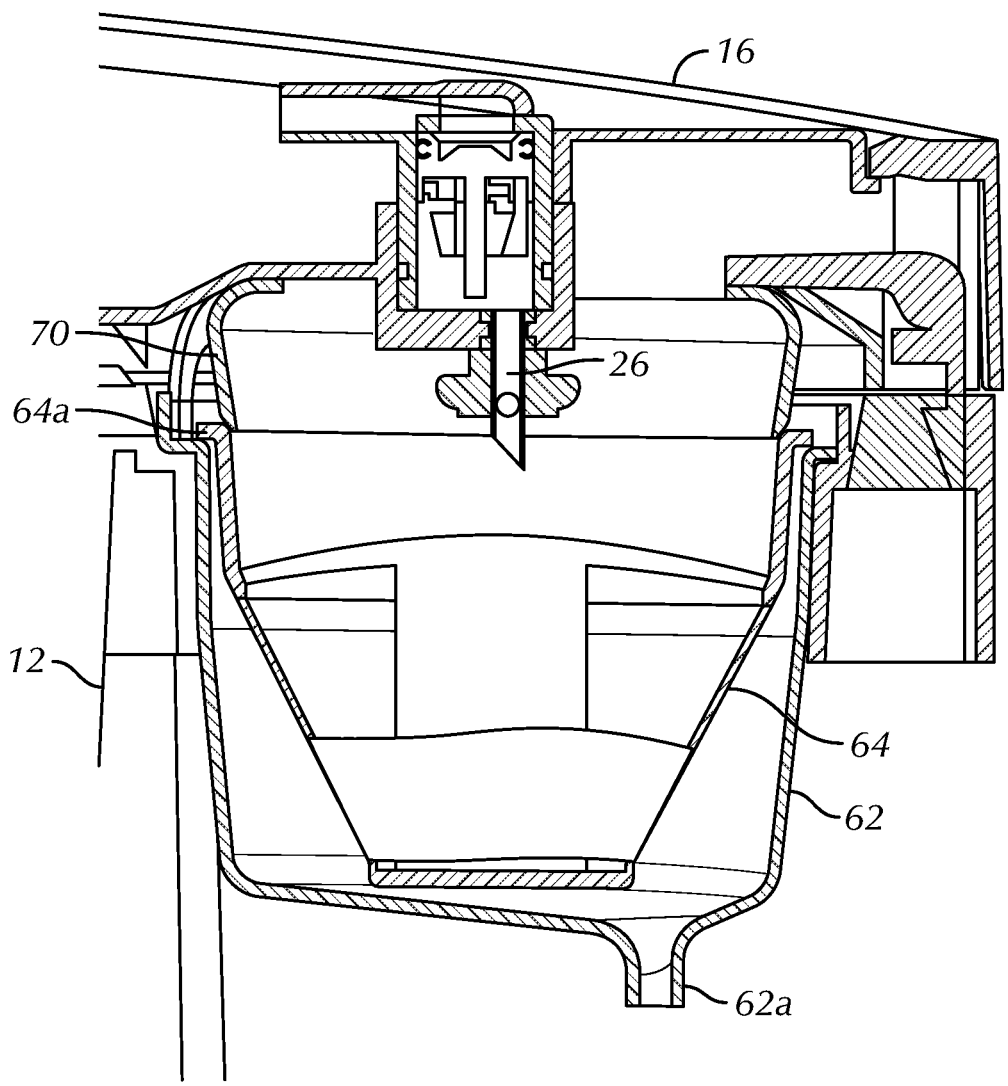
FIG. 7 is an enlarged partial cross-sectional left side elevational view of the beverage maker of FIG. 1, taken along sectional line 4A-4A of FIG. 1, with the cover in the closed position and a basket cover sealingly engaging the basket

The beverage maker 10 preferably allows a user to create a beverage from foodstuff in any one of a variety of different forms or states. For example, the beverage maker 10 may be used to make a hot beverage from loose grounds or leaves. In one embodiment, as shown in FIG. 7, the body 12 includes funnel 62 oriented above the recess 14, through which a beverage is dispensed. The funnel 62 includes a basket 64 having an open upper end 64a for receiving loose foodstuff grounds or the like, as will described in further detail below. The basket 64 may include a filter (not shown) or be configured to receive a conventional or specialized filter to facilitate infusion of the loose grounds with the liquid.

Figure 2:
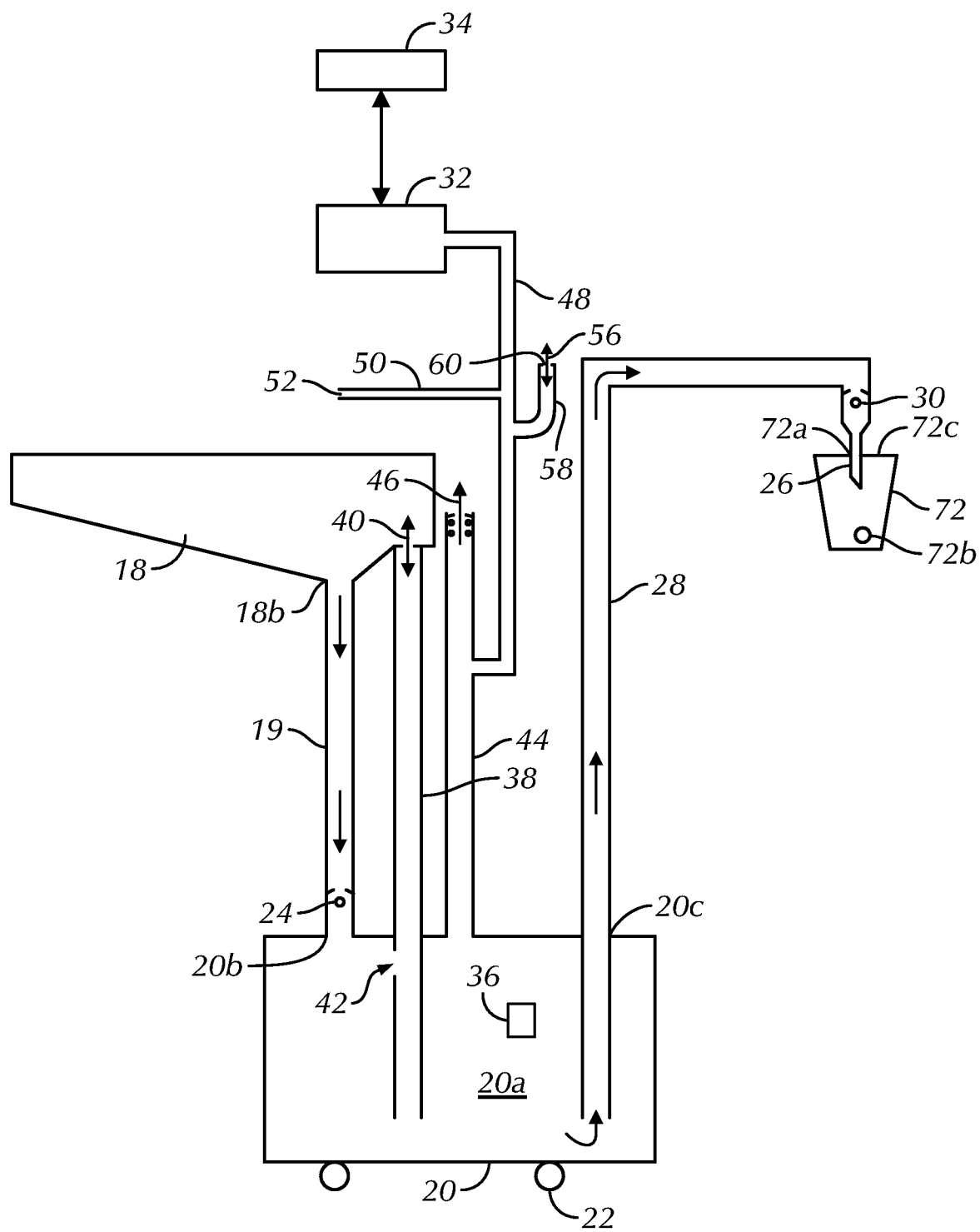
FIG. 2 is a schematic block diagram of certain components of the beverage maker of FIG. 1.
Figure 5A:
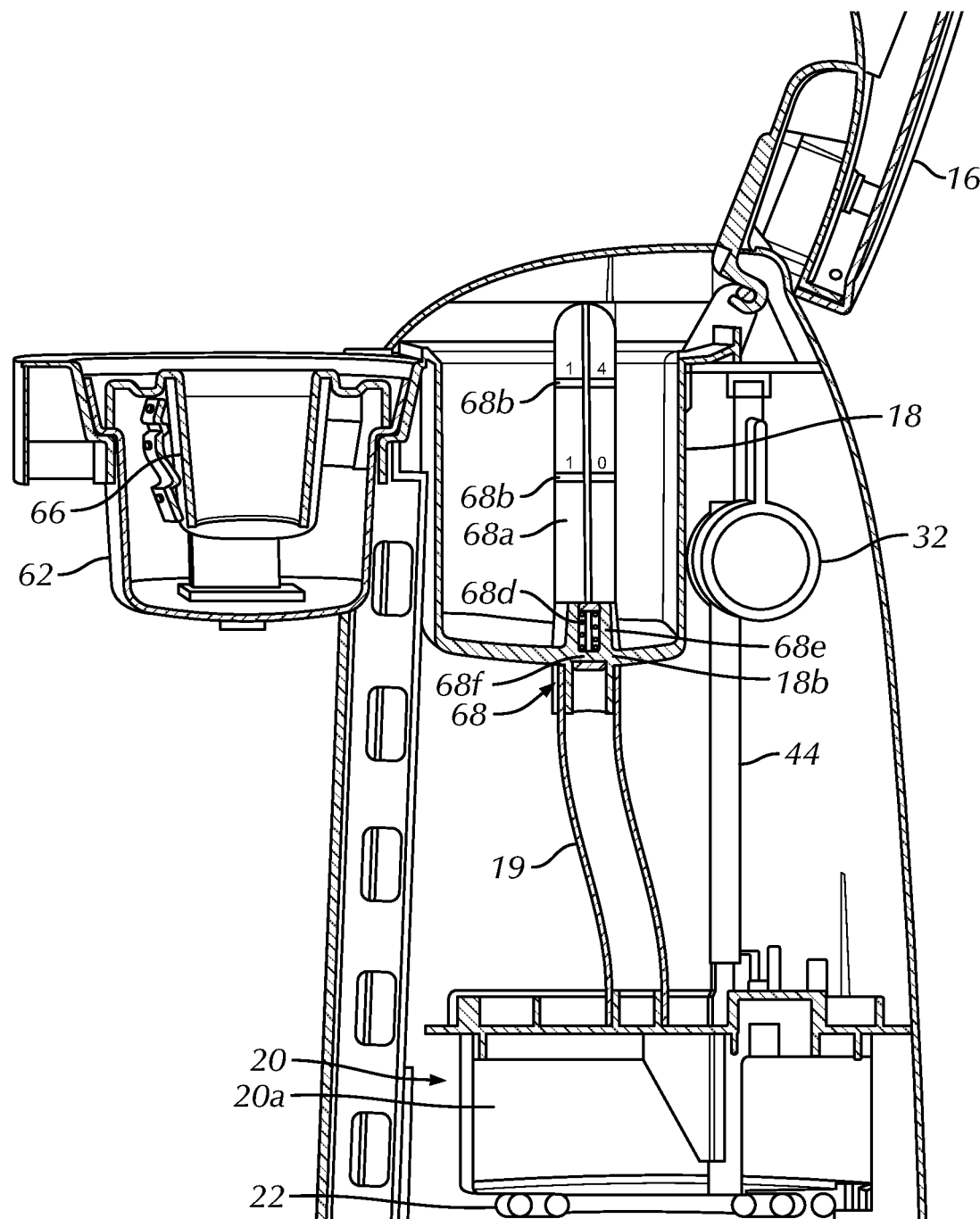
FIG. 5A is a partial cross-sectional right side elevational view of the beverage maker of FIG. 1, taken along sectional line 5A-5A of FIG. 1, with the cover in the open position and a metering valve in the closed position.
Figure 5B:
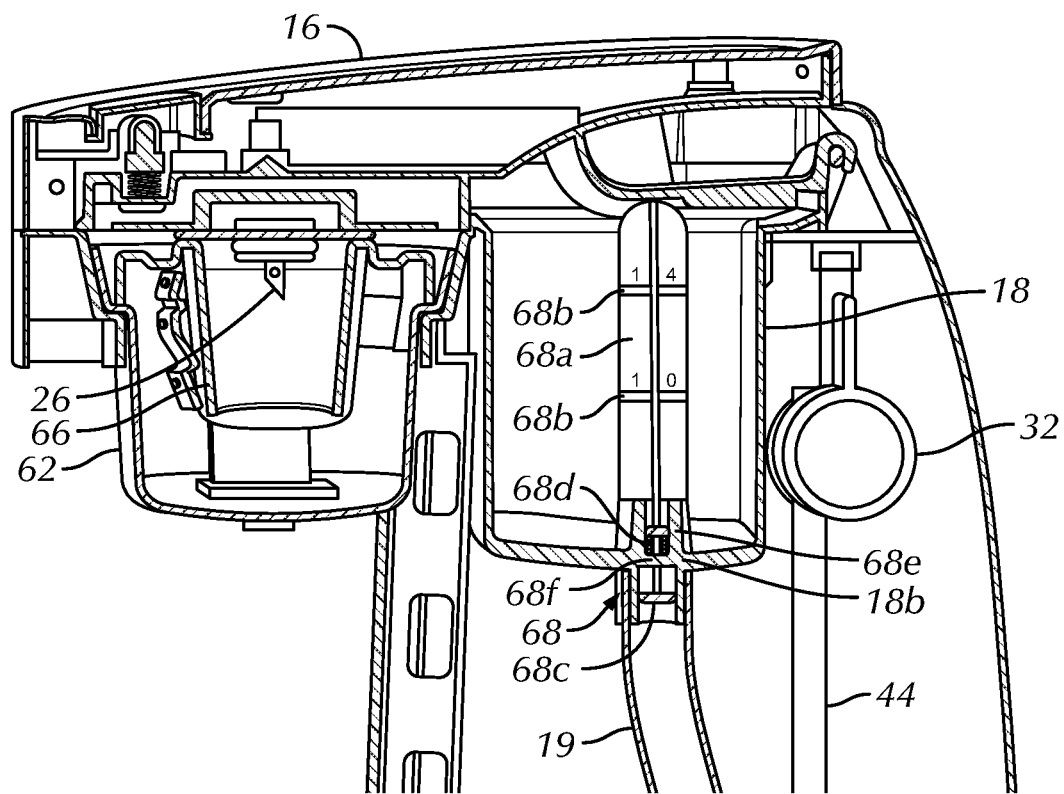
FIG. 5B is a partial cross-sectional right side elevational view of the beverage maker of FIG. 1, taken along sectional line 5A-5A of FIG. 1, with the cover in the closed position and a metering valve in the open position.

Alternatively, as shown in FIGS. 5A and 5B, the beverage maker 10 may be used to make a beverage from grounds or leaves packed in a generally soft packet (i.e., a flexible "pod" or a bag), or grounds or leaves packed in a generally hard container/cartridge 72 (shown schematically in FIG. 2). The cartridge 72 may include a generally rigid body and a cap or foil top removable therefrom. For example, the cartridge 72 may be a conventional K-CUP®, a rigid pod, or any other structure that is capable of holding or storing foodstuff. As shown in FIGS. 5A and 5B, the funnel 62 includes a cartridge holder 66, for receiving a cartridge 72 therein. The cartridge 72 is preferably removably insertable into the cartridge holder 66. As should be understood, however, the funnel 62 may accommodate both the basket 64 and the cartridge holder 66, e.g., the shell 66 being removably supported within the basket 64, such that a user may select whether to utilize loose grounds with the basket 64 or grounds contained with a cartridge 72 with the cartridge holder 66.

The beverage maker 10 further includes a cover 16 movably, e.g., hingedly or otherwise pivotably, attached to an upper end of the body 12. The cover 16 is movable between an open position (FIG. 3A) to provide and allow access to the interior of the body 12, including access to the funnel 62 for inserting foodstuff therein, and a closed position (FIG. 1), closing the upper end of the body 12, as described in further detail below, and preventing access to the interior of the body 12.

FIG. 2 is a schematic block diagram of various components of the beverage maker 10, enclosed by the body 12, to illustrate the flow of fluid therethrough. As shown, the body 12 includes a reservoir 18 for receiving a liquid inserted by the user, to be used for preparing a beverage, when the cover 16 is moved into the open position. The term "reservoir" is broadly used herein throughout as a body, cavity, or conduit that holds a volume of liquid, either temporarily or for an extended period of time. The reservoir 18 is preferably sized, shaped and/or configured to receive at least an amount of liquid that is suitable for at least a single-serving size (up to approximately sixteen ounces). However, as should be understood by those of ordinary skill in the art, the reservoir 18 may alternatively be sufficiently sized to receive an amount of liquid that is capable of filling an entire carafe of approximately one liter or greater, for example. As also should be understood by those of ordinary skill in the art, the reservoir 18 may alternatively be removably attached to the interior or exterior of the body 12.

An outlet 18b is formed in a lower portion of the reservoir 18, and at least a portion of a bottom wall of the reservoir 18 may be slanted or sloped to direct liquid within the reservoir 18 toward the outlet 18b. The body 12 further includes a hot liquid generator (HLG) 20 having a HLG tank 20a for receiving liquid. At least one heater 22 is in thermal communication with liquid in the HLG tank 20a.

The HLG tank 20a is, for example, a boiler or the like. However, the HLG 20 need not be a tank and may instead be in the form of a generally U-shaped, tubular, aluminum extrusion, or the like. The heater 22 is preferably located outside of, and in contact with, the HLG tank 20a to heat the liquid therein. However, the heater 22 may also be located inside the HLG tank 20a in direct or indirect physical contact with the liquid. The HLG tank 20a preferably includes an inlet 20b (i.e., upstream side) and an outlet 20c (i.e., downstream side). The inlet 20b of the HLG tank 20a is fluidly connected to the outlet 18b of the reservoir 18 via a fill tube 19, for receiving liquid therefrom. The phrase "fluidly connected" is broadly used herein as being in direct or indirect fluid communication.

The beverage maker 10 further includes an inlet check valve 24 positioned in the fill tube 19 between the reservoir 18 and the HLG tank 20a. Liquid flows from the reservoir 18 to the HLG tank 20a, e.g., via gravity, through the inlet check valve 24. The inlet check valve 24 prevents liquid from flowing back out of the inlet 20b of the HLG tank 20a toward the reservoir 18. The inlet check valve 24, and any other check valves described herein, may be any type of one-way valve, such as a silicone flapper, a ball-type valve, a diaphragm-type valve, a duckbill valve, an in-line valve, a stop-check valve, a lift-check valve, or the like.

A discharge port 26, attached to the movable cover 16 (FIGS. 3, 5B, 7) and movable therewith, is in fluid communication with the HLG 20 via the outlet 20c thereof, and is located above, and in fluid communication with the funnel 62, having foodstuff therein. A discharge or riser tube 28 fluidly connects the outlet 20c of HLG tank 20a to the discharge port 26. A check valve 30, similar to the check valve 24, is located proximate the discharge port 26 to prevent fluid flow back into the discharge tube 28 and the HLG tank 20a.

The discharge port 26 may include one or more relatively small or narrow internal passageway(s). At least a portion of an outlet end of the discharge tube 28 may be slanted or sloped to direct liquid toward the discharge port 26. A lower tip of the discharge port 26 may be sharp or pointed for piercing a cartridge 72 in the funnel 62, when present. Thus, in embodiments where a cartridge 72 is used and properly inserted into the cartridge holder 66 in the funnel 62, an interior of the cartridge 72 is fluidly connected to the discharge port 26. More specifically, the motion of closing the cover 16 brings the pointed end of the discharge port 26 into contact with the top or cap 72c of the cartridge 72, such that the tip or distal end of the discharge port 26 at least partially pierces or is otherwise inserted into the cap 72c of the cartridge 72.

As should be understood, prior to being inserted into the funnel 62, the cartridge 72 may be air-tight. However, once the cartridge 72 is properly inserted into the cartridge holder 66 in the funnel 62 and the cover 16 is closed, at least two spaced-apart holes are preferably formed or present in the cartridge 72. A first hole 72a exists by or at the discharge port 26 piercing or being inserted into the cartridge cap 72c. Thus, the first hole 72a is preferably formed in an upper end or cap 72c of the cartridge 72. The first hole 72a can be formed by moving the cover 16, and thus the lower tip of the discharge port 26, with respect to the generally stationary funnel 62, into the closed position. A second hole 72b is present or is formed preferably in or near a lower end of the cartridge 72 and vertically below foodstuff grounds within the cartridge 72. The second hole 72b can be formed during and/or after the cartridge 72 is properly inserted into the cartridge holder 66. The second hole 72b allows the infused beverage to leave the cartridge 72 for dispensing into a receptacle.

Liquid may exit the discharge port 26 at an angle with respect to a longitudinal axis of the discharge port 26. In particular, liquid may exit the discharge port 26 at an angle between approximately thirty and ninety degrees (30°-90°) with respect to a longitudinal, i.e., major, axis of the body 12. However, liquid may alternatively exit the discharge port 26 in a manner that is parallel to the longitudinal axis of the body 12. Other geometric arrangements may also be suitable. As should be understood by those of ordinary skill in the art, the discharge port 26 may alternatively resemble a more conventional showerhead of an automatic drip coffee-maker (ADC) for use with loose infusible material in the basket 64.

An air pump 32 is provided within the body 12 for moving, i.e., displacing, liquid in the HLG tank 20a through the discharge tube 28 to the discharge port 26. As should be understood by those of ordinary skill in the art, however, a water pump may be utilized instead of, or in addition to, the air pump 32. As also should be understood by those of ordinary skill in the art, the beverage maker 10 may be steam operated rather than pump operated, as described, for example, in U.S. patent application Ser. No. 13/949,394, filed Jul. 24, 2013, entitled "Kitchen Appliance for Preparing a Beverage and Method of Operating Same," the disclosure of which is hereby incorporated by reference in its entirety.

Operation of the air pump 32 can be automatic or controlled by a user through selective manipulation of a display (not shown). The air pump 32 preferably empties the HLG tank 20a of liquid, as will be described in detail below. As will also be described in detail below, operation of the air pump 30 is controlled in the illustrated embodiment via a controller 34 using feedback from at least one temperature sensor 36 operatively connected to the HLG tank 20a for sensing the temperature of the liquid therein. As should be understood, any temperature sensor 36, currently known or that later becomes known by those of ordinary skill in the art may be utilized, such as, for example, without limitation, a thermistor that changes resistance with temperature and transmits a corresponding voltage to the controller 34. A liquid level sensor (not shown), operatively connected to the controller 34, may also be present in the HLG tank 20a to detect and provide liquid level feedback to the controller for operation of the heater 22.

The controller 34 may be any type of controller, such as a microprocessor, multiple processors, or the like. The controller 34 preferably includes or is operatively coupled to a memory (not shown) that stores the code or software for carrying out operation of the beverage maker 10. The memory can be any known or suitable memory device such as random access memory (RAM), read only memory (ROM), flash RAM, or the like. The controller 34 may also include, as hardware or software, or may be operatively connected to other components, such as clocks, timers, or the like (not shown) used for operating the beverage maker 10.

As shown schematically in FIG. 2, a vent tube 38 is provided to allow air, displaced by liquid entering the HLG tank 20a from the reservoir 18, to escape from the HLG tank 20a. In the illustrated embodiment, the vent tube 38 extends from within the HLG tank 20a to the reservoir 18. Preferably, the vent tube 38 extends from proximate a lower portion or base of the HLG tank 20a and defines an inner diameter within the range of approximately 1.5 mm to approximately 2.5 mm. A vent valve 40 is located in the vent tube 38 proximate the reservoir 18 and a vent orifice 42 is located in the vent tube 38, proximate an upper or top inner surface of the HLG tank 20a. The vent orifice 42 has a diameter within the range of approximately 1 mm to approximately 3 mm, and preferably approximately 2 mm. In the illustrated embodiment, the vent valve 40 is located within the reservoir 18, although the vented air may be directed to other locations as well.

The vent valve 40 is biased into a normally open position to allow air to escape from the HLG tank 20a through the vent tube 38 (including through the vent orifice 42) and out the vent valve 40 as liquid is received into the HLG tank 20a from the reservoir 18. The vent valve 40 is preferably a needle valve or the like, although other types of valves, currently known or that later become known, may be used as well. As will be described in further detail below, the diameter of the vent orifice 42 is particularly set to balance between allowing air to escape therethrough during filling of the HLG tank 20a and thereafter assisting in building pressure within the HLG tank 20a for dispensing the liquid therefrom.

An overpressure tube 44 is also provided and connected to the HLG tank 20a to vent excess pressure caused by any malfunction. An overpressure valve 46, which is preferably in the form of a spring biased needle valve or the like, is located at an end of overpressure tube 44 opposite the HLG tank 20a. Conversely to the vent valve 40, the overpressure valve 46, i.e., safety valve, is biased into a normally closed position under normal operating conditions and is configured to move against the bias into an open position at a predetermined internal pressure of the HLG tank 20a, determined to be an abnormally high amount of pressure. In the illustrated embodiment, a pump line 48 from the air pump 32 joins the overpressure tube 44 for communicating with the HLG tank 20a and the overpressure valve 46. However, as should be understood, other methods of connecting the air pump 32 to the HLG tank 22 may be utilized as well.

In the event that an abnormally high amount of pressure builds up in the HLG tank 20a (at or above the predetermined internal pressure set for the overpressure valve 46), e.g., due to malfunctioning of the heater 22 or the air pump 32, air is allowed to escape through the overpressure valve 46 to relieve the excessive pressure. That is, the overpressure valve 46 operates as a course adjustment of pressure within the system for releasing excess pressure at a high release rate.

As also shown schematically in FIG. 2, a pressure regulation tube 50 having a pressure regulation orifice 52 branches off the pump line 48, and is therefore fluidly communicated with the air pump 32. The pressure regulation orifice 52 is sized and configured to bleed off minor excess pressure caused by the air pump 32 during normal operation, to assist in maintaining an even pressure within the system during air pump 32 operation. That is the pressure regulation orifice 52 operates as a fine adjustment of pressure within the system.

Figure 3A:
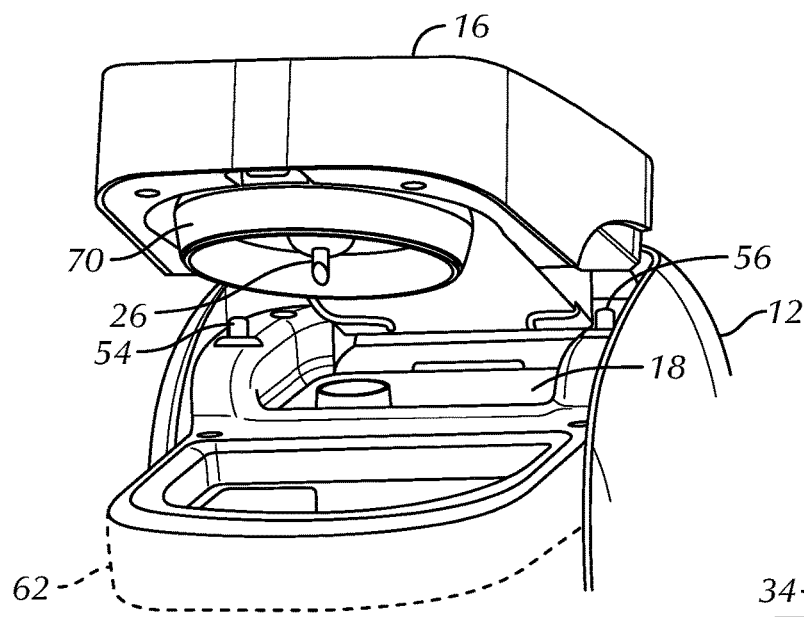
FIG. 3A is an enlarged top, front perspective view of an upper portion of the beverage maker of FIG. 1, with a cover of the beverage maker in a partially open position.
Figure 3B:
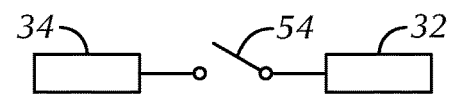
FIG. 3B is a schematic block circuit diagram between a controller and an air pump of the beverage maker of FIG. 1, with a switch therebetween in the off position.
Figure 3C:
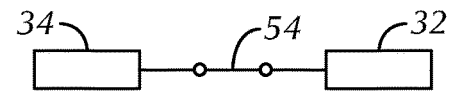
FIG. 3C is a schematic block circuit diagram between the controller and the air pump of the beverage maker of FIG. 1, with the switch therebetween in the on position.

As shown in FIG. 3A, the body 12 further includes a switch 54, e.g., a contact or microswitch, located at the upper end thereof and electrically coupled with the controller 34 and the pump 32 (shown schematically in FIGS. 3B, 3C). The switch 54 is biased in an off position (FIG. 3B) when the cover 16 is raised, electrically disconnecting the controller 34 from the pump 32, and is actuatable by the cover 16 in a closed position into an on position (FIG. 3C), electrically connecting the controller 34 with the pump 32, in a manner well understood by those of ordinary skill in the art. Alternatively, the switch 54 may be connected between the pump 32 and a source of electrical power (not shown) for the pump 32 to provide or remove power from the pump 32. When the cover 16 is in the closed position thereof (FIG. 1), the cover 16 mechanically actuates, e.g., depresses, the switch 54 to overcome the bias into the on position (FIG. 3C). Thus, when the cover 16 is in the closed position, the controller 34 (or electrical power) is electrically connected with the pump 32, and therefore may operate the pump 32 when necessary. Conversely, when the cover 16 is moved away from the closed position (FIG. 3A), e.g., into an open position thereof, the cover 16 releases the switch 54 for return into the off position (FIG. 3B). Thus, when the cover 16 is open, the pump 32 is inoperable, and if the cover 16 is opened during a brewing cycle, as described in further detail below, pump 32 operation is immediately terminated as the pump 32 is electrically disconnected from the controller 34.

Figure 4A:
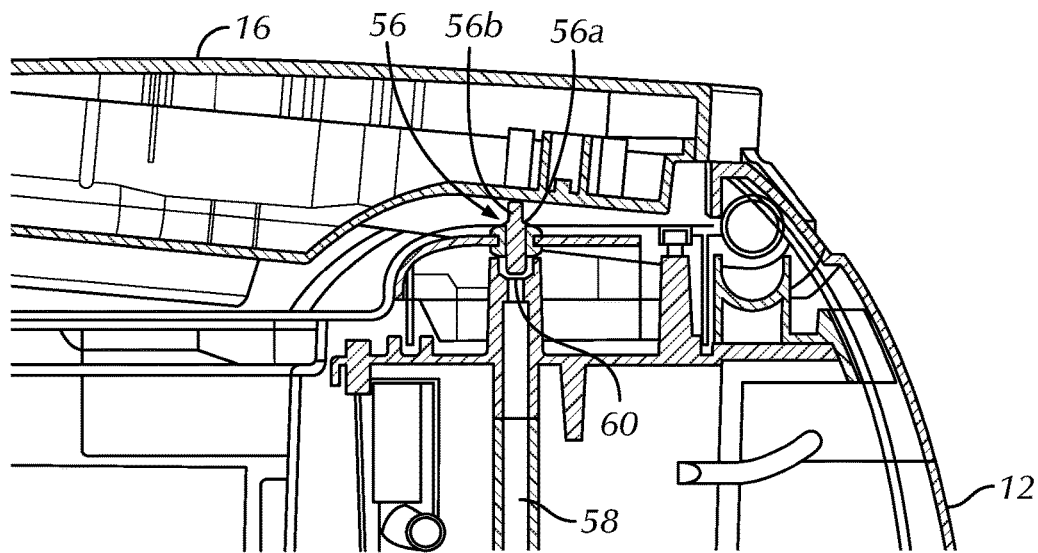
FIG. 4A is a partial cross-sectional right side elevational view of the beverage maker of FIG. 1, taken along sectional line 4A-4A of FIG. 1, with an embodiment of a pressure release valve engaged by the cover.

As shown in FIG. 4A (and schematically in FIG. 2), the body 12 also includes a pressure release valve 56 located at the upper end thereof and in fluid communication with at least the pump 32 and the HLG tank 20a, via a pressure release line 58. The pressure release valve 56 is biased into one of an open position for releasing pressure within the HLG tank 20a therethrough and a closed position for preventing the release of pressure within the HLG tank 20a therethrough, and the pressure release valve 56 is actuatable by the cover 16 into the other of the open and closed positions.

For example, as shown in FIGS. 3A, 4A, the pressure release valve 56 is located forward of the pivot attachment between the cover 16 and the body 12, i.e., on the same side of the pivot attachment as the reservoir 18 and the funnel 62. The pressure release valve 56 is in operative engagement with a first orifice 60 of the pressure release line 58. The valve 56 includes a generally hollow and dome-shaped elastic valve body 56a defining an integral elastic spring, monolithic with the valve body 56a, and a generally central valve stem 56b projecting through, and monolithic with, the valve body/spring 56a. The base of the dome-shaped elastic valve body 56a is spaced from the first orifice 60. The first orifice 60 defines a valve seat of the pressure release valve 56 that is sized and shaped to sealingly receive the valve stem 56b in the closed position of the pressure release valve 56.

The elastic valve body 56a of the valve 56 biases, i.e., spaces, the valve stem 56b away from the first orifice 60, such that the valve 56 is in an open position, for releasing pressure within the HLG tank 20a from the first orifice 60 through the space between the first orifice 60 and the base of the dome-shaped elastic valve body 56a. Accordingly, when the cover 16 is in an open position, i.e., partially or fully open, disengaged from the valve stem 56b, the elastic valve body 56a biases the pressure release valve 56 into the open position, spaced from the first orifice 60. Conversely, when the cover 16 is in the closed position thereof, the cover 16 mechanically overcomes the bias of the elastic valve body 56a and mechanically moves, e.g., depresses, the valve stem 56b downwardly into sealing engagement with the first orifice 60, thereby closing the valve 56.

Thus, when the cover 16 is open, the pressure release valve 56 is open and pressure cannot build up in the HLG tank 20a (but rather is released from the valve 56), and if the cover 16 is opened during operation of a brewing cycle, the valve 56 is released, thereby opening and pressure within the HLG tank 20a is substantially immediately released, thereby preventing further discharge of hot liquid from the discharge port 26, as described in further detail below. As also described further below, pressure released through the valve 56 is redirected to a location generally not accessible by, or substantially not directed toward, the consumer, such as, for example, without limitation, into the body 12, reservoir 18 or a drip tray.

Figure 4B:
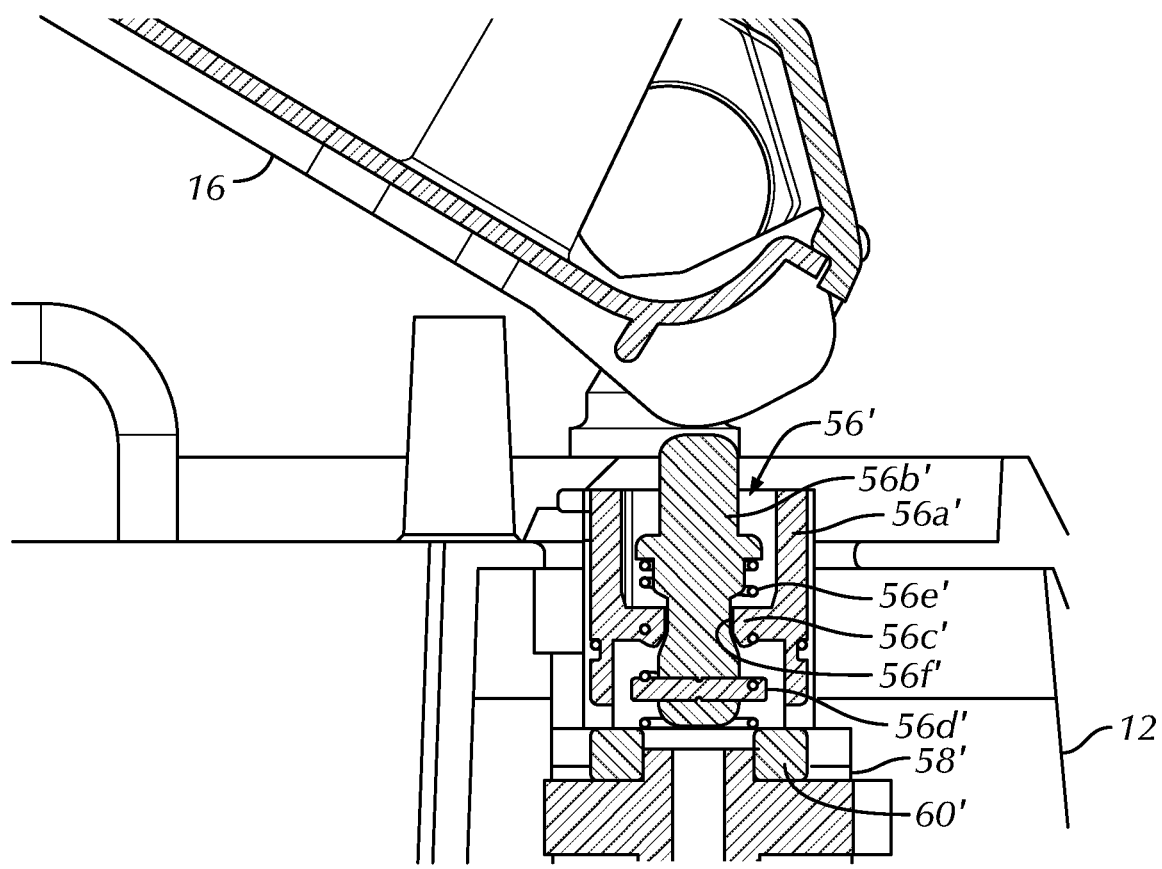
FIG. 4B is a partial cross-sectional right side elevational view of the beverage maker of FIG. 1, taken along sectional line 4A-4A of FIG. 1, with an alternative embodiment of a pressure release valve engaged by the cover.

Alternatively, in the embodiment of FIG. 4B, the pressure release valve 56' is located rearwardly of the pivot attachment between the cover 16 and the body 12, i.e., the opposing side of the pivot attachment relative to the reservoir 18 and the funnel 62. The pressure release valve 56' is attached to the first orifice 60' of the pressure release line 58', in fluid communication with the pump 32 and the HLG tank 20a. The pressure release valve 56' includes a generally cylindrical, hollow valve body 56a' and an annular valve seat 56c' projecting radially inwardly from the valve body 56a'. The annular valve seat 56c' includes a generally central aperture 56f. A valve stem 56b' projects through the valve body 56a' and the aperture 56f of the valve seat 56c'. The valve stem 56b' also includes an annular seal 56d' attached thereto, proximate a base end thereof. A spring 56e', e.g., a coil spring or the like, is operatively connected between the valve body 56a' and the valve stem 56b', and normally biases the annular seal 56d' into sealing engagement with the valve seat 56c'. Thus, conversely to pressure release valve 56, the pressure release valve 56' is biased by the spring 56e' into the closed position.

Accordingly, when the cover 16 is opened (FIG. 4B), the cover 16 engages the valve stem 56b' and mechanically actuates, e.g., depresses, the valve stem 56b' against the bias of the spring 56e', thereby disengaging and spacing the annular seal 56d' from the valve seat 56c' and opening the pressure release valve 56' to allow pressure within HLG tank 20a to release therethrough. Upon movement of the cover 16 to the closed position thereof, the cover 16 mechanically releases the valve stem 56b' of the valve 56' for return into the closed position via the bias of the spring 56e'. Thus, similarly to the embodiment of FIG. 4A, when the cover 16 is open, the pressure release valve 56' is open and pressure cannot build up in the HLG tank 20a (but rather is released from the valve 56'), and if the cover 16 is opened during operation of a brewing cycle, the valve 56' opens and pressure within the HLG tank 20a is substantially immediately released, thereby preventing further discharge of hot liquid from the discharge port 26, as described in further detail below.

Operation of the beverage maker is similar to the method of operation described in U.S. patent application Ser. No. 14/177,347, filed Feb. 11, 2014 and entitled "Computer Controlled Coffeemaker," which is assigned to the assignee of the present application and is hereby incorporated by reference in its entirety, as if fully set forth herein. Nonetheless, general operation of the beverage maker 10 will now be described.

The beverage maker 10 is first powered on, e.g., when the beverage maker 10 is plugged into an outlet, recovers from a power failure, or the like. At power on, the controller 34 enters into communication with at least the liquid level sensor (not shown), the temperature sensor 36 in the HLG tank 20a, the heater 22, and the air pump 32.

To make a beverage, a user opens the cover 16 to access the reservoir 18 and the funnel 62. Once the cover 16 is opened, the switch 54 is released and returns to the off position (FIG. 3B), electrically disconnecting the controller 34 from the pump 32 (or the pump 32 from a power source). The pressure release valve 56, 56' is also opened. The user then either adds loose grounds into the basket 64 or inserts a cartridge 72 into the cartridge holder 66, and pours liquid, e.g., water, into the reservoir 18.

In one embodiment, as shown in FIGS. 5A, 5B, a metering valve 68 is located at the outlet 18b of the reservoir 18, to assist the user in determining the volume of liquid poured into the reservoir 18. The metering valve 68 is in fluid communication with the fill tube 19, and includes a valve body 68e defining a valve seat 68f and a metering stem 68a projecting through the valve body 68e and upwardly past the open upper end of the reservoir 18. The metering stem 68a has metering markings 68b thereon for indicating a volume of liquid within the reservoir 18. As shown best in FIG. 5B, the metering valve 68 further includes an annular seal 68c attached thereto proximate a base end thereof. A spring 68d, e.g., a coil spring or the like, is operatively connected between the valve body 68e and the metering stem 68a, and normally biases the annular seal 68c into sealing engagement with the valve seat 68f (FIG. 5A). Therefore, when the user pours liquid into the reservoir 18 (with the cover 16 open), the metering valve 68 is biased into a closed position (FIG. 5A) and the liquid accumulates in the reservoir 18. Thus, the user can tell how much liquid has been poured according to the metered markings 68b on the metering stem 68a.

Once the user pours in the desired volume of liquid, the user closes the cover 16. The cover 16 mechanically actuates, e.g., depresses, the metering stem 68a (FIG. 5B), against the bias of the spring 68d, into an open position of the metering valve 68, thereby releasing the liquid within the reservoir through the metering valve 68 and fill tube 19 and into the HLG tank 20a. Air within the HLG tank 20a that is displaced by the liquid, escapes through the vent tube 38 (including through vent orifice 42) and vent valve 40, which is biased into the open position thereof.

Figure 6:
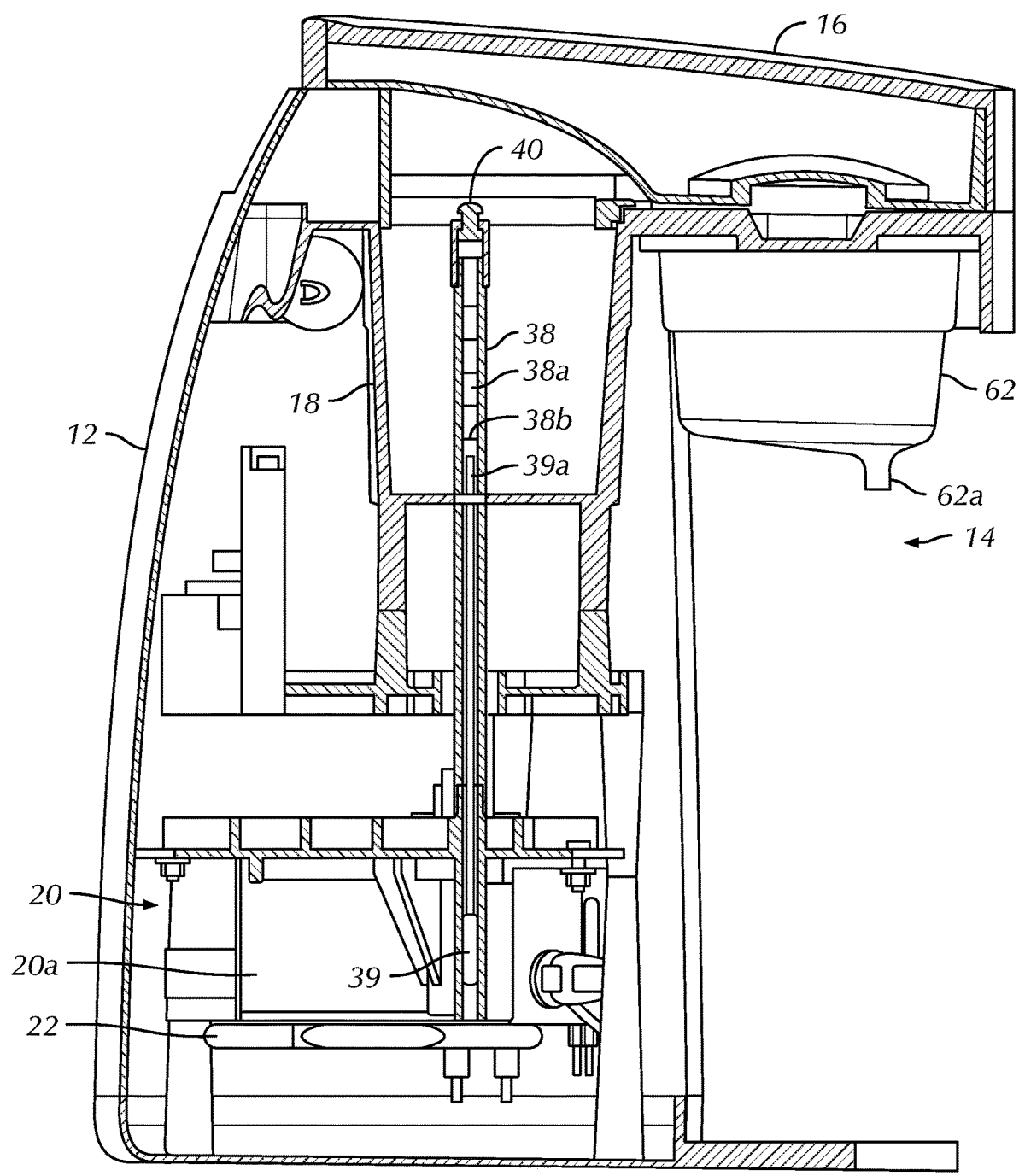
FIG. 6 is a partial cross-sectional left side elevational view of the beverage maker of FIG. 1, taken along sectional line 5A-5A of FIG. 1, showing a floatation member and floatation stem for indicating an amount of liquid in the hot liquid generator.

Alternatively, in the embodiment illustrated in FIG. 6, the vent tube 38 extends proximate to the upper end of the reservoir 18, and includes a viewing section 38a within the reservoir 18, that is visible to the user from inside the reservoir 18 and/or the external surface of the body 12. The viewing section 38a is, for example, transparent or translucent, and includes measured markings 38b thereon for indicating a volume of liquid within the HLG tank 20a. A floatation member 39 is located within the vent tube 38 having a floatation stem 39a projecting therefrom toward the reservoir 18. Accordingly, when the user pours liquid into the reservoir 18, which flows into the HLG tank 20a, the liquid within the HLG tank 20a raises the floatation member 39 and an upper end of the floatation stem 39a becomes visible through the viewing section 38a of the vent tube 38, relative to the measured markings 38b, thereby indicating the volume of liquid within the HLG tank 20a. As in the above-described embodiment, air within the HLG tank 20a that is displaced by the liquid, also escapes through the vent tube 38 and vent valve 40, which is biased into the open position thereof.

In either embodiment, as liquid rises in the HLG tank 20a, the liquid reaches and exceeds the base end of the vent tube 38. As the pressure within the HLG tank 20a and the vent tube 38 is approximately the same, the liquid enters and rises through the vent tube 38 along with the rise of liquid in the HLG tank 20a. Thus, the liquid level within the vent tube 38 is approximately equivalent to the liquid level within the HLG tank 20a, and effectively closes the base end of the vent tube 38. Nonetheless, the vent orifice 42, above the liquid level, continues to allow air to enter the vent tube 38 and escape through the vent valve 40.

After pouring the desired amount of liquid into the beverage maker 10, the user returns the cover 16 into the closed position, mechanically actuating the switch 54 into the on position (FIG. 3C) to electrically connect the controller 34 with the pump 32 (or the pump 32 to the power source). The pressure release valve 56, 56' is also closed. The user then initiates the brewing cycle, e.g., by selecting a button or combination of buttons. The controller 34 thereafter energizes the heater 22 and also confirms that there is sufficient liquid in the HLG tank 20a, via feedback from the liquid level sensor. As should be understood by those of ordinary skill in the art, if the controller 34 determines that there is an insufficient amount of liquid in the HLG tank 20a, the user is notified, e.g., a visual or audible alert is made to the user, and the heater 22 is turned off.

As the heater 22 heats the liquid within the HLG tank 20a, the temperature sensor 36 communicates with the controller 34, providing feedback correlating to the temperature of the liquid within the HLG tank 20a. The controller 34 periodically reads the feedback and calculates the temperature within the HLG tank 20a in a manner well understood by those of ordinary skill in the art, to assess whether the temperature of the liquid in the HLG tank 20a has reached or exceeded a preset final value, e.g., within the range of approximately 89° C. to approximately 95° C.

As should be understood, heating of the liquid within the HLG tank 20 causes expansion of the liquid, that, in turn, causes the liquid level to rise further in the vent tube 38. Vapor is also generated within the HLG tank 20a, e.g., via thin film boiling (as should be understood by those of ordinary skill in the art), which creates pressure in the HLG tank 20a. The vapor attempts to escape the HLG tank 20a via the vent orifice 42. However, due to the diameter of the vent orifice 42, the developing vapor begins to overwhelm the vent orifice 42, i.e., the vent orifice 42 begins to restrict the flow rate for adequate vapor escape. Once the temperature of the liquid within the HLG tank 20a reaches the preset final value, the controller 34 energizes the air pump 32. The controller 34 may also power the heater 22 off.

Operation of the air pump 32 causes a sudden additional increase in pressure within the HLG tank 20a, thereby overwhelming the vent orifice 42, i.e., the vent orifice 42 can no longer accommodate the necessary flow rate therethrough for pressure relief, and building a pressure differential between the (greater) pressure in the HLG tank 20a relative to the (lower) pressure within the vent tube 38. The pressure differential causes the liquid within the vent tube 38 to further rise, ultimately blocking the vent orifice 42. Once the vent orifice 42 is blocked, air can no longer escape the HLG tank 20a, thereby accelerating the rate of liquid rising within the vent tube 38 and compressing the air therein. The rapid compression of the air within the vent tube 38 closes the vent valve 40.

Once the vent valve 40 is closed, the valve 40 remains closed due to the static air pressure within the vent tube 38 (Bernoulli's principle), as should be understood by those of ordinary skill in the art. Once the vent valve 40 is closed, the pressure within the HLG tank 20a continues to increase, thereby forcing the heated liquid out of the HLG outlet 20c, for proceeding through the discharge tube 28 and exiting through the discharge port 26 to interact with the foodstuff grounds, e.g., with the loose grounds in the basket 64 or in the cartridge 72.

Where a cartridge 72 packing foodstuff grounds is utilized, the cartridge 72 remains at least relatively or even fully air-tight, thereby acting as a restriction on the discharge port 26. To overcome this restriction, the heated liquid flows under pressure through the discharge port 26 and into the cartridge 72 to saturate the foodstuff therein. The heated liquid is therefore forced to flow through the saturated foodstuff under pressure and exits the cartridge 72 into the funnel 62. By pressurizing the heated liquid within the cartridge 72, the liquid wicks better with the grounds to create a stronger hot beverage, and the brewed beverage is dispensed at a faster flow rate.

Conversely, where the basket 64 having loose grounds therein is used, the basket 64 generally does not restrict the discharge port 26 in the same manner. Accordingly, as shown in FIG. 7, the cover 16 includes a basket cover 70 attached to an inner side thereof, and is located and shaped to sealingly engage the upper end of the basket 64 when the cover is moved into the closed position. The sealing engagement between the basket cover 70 and the basket 64 maintains the basket 64 at least relatively or even fully air-tight, similarly to the cartridge 72, such that pressurized heated liquid flows through the basket 64 in substantially the same manner as the heated liquid flows through the cartridge 72, and into the funnel 62. Additionally, the sealed engagement between the basket cover 70 and the basket 64 prevents foodstuff or liquid from flowing out of the upper end of the basket 64.

The funnel 62 may include a sloped floor to a funnel outlet 62*a*. The brewed beverage drains from funnel outlet 62*a* and into a receptacle (not shown) positioned in the recess 14. At this point a normal brew cycle has been completed. If, however, the user opens the cover 16 at any point during the brewing cycle, the switch 54 is released by the cover 16 and returns to the off position (FIG. 3B), electrically disconnecting the controller 34 from the pump 32 (or the pump 32 from the power source), and the pressure release valve 56, 56' is also opened. That is, in the embodiment of FIG. 4A, the cover 16 releases the pressure release valve 56 for return into the open position. Conversely, in the embodiment of FIG. 4B, the cover 16 mechanically actuates, e.g., depresses, the pressure release valve 56' into the open position. In either embodiment, the pressure within the HLG 20*a* is substantially immediately relieved. Accordingly, as the pressure with the HLG tank 20*a* is relieved and the air pump 32 is powered off (thereby no creating any additional pressure) substantially no heated liquid can be dispensed from the discharge port 26, preventing possible injury to the user.

FIGS. 8A-9B illustrate a second preferred embodiment of a beverage maker 110 of the present disclosure. The reference numerals of the present embodiment are distinguishable from those of the earlier embodiment(s) by a factor of one hundred (100), but otherwise indicate the same elements as indicated above, except as otherwise specified. Where a component of the beverage maker 110 is unchanged from the earlier embodiment(s) and is not shown in FIGS. 8A-9B, however, the reference numeral of the earlier embodiment will be utilized.

The beverage maker 110 of the present embodiment is substantially similar to that of the earlier embodiment(s). While certain like reference numerals may be shown in FIGS. 8A-9B, the description of certain similarities between the embodiments may be omitted herein for the sake of brevity and convenience, and, therefore, is not limiting. A primary difference of the beverage maker 110, 110' in comparison to the beverage maker 10 is the location and design of the pressure release valve 156, 156'.

Figure 8A:
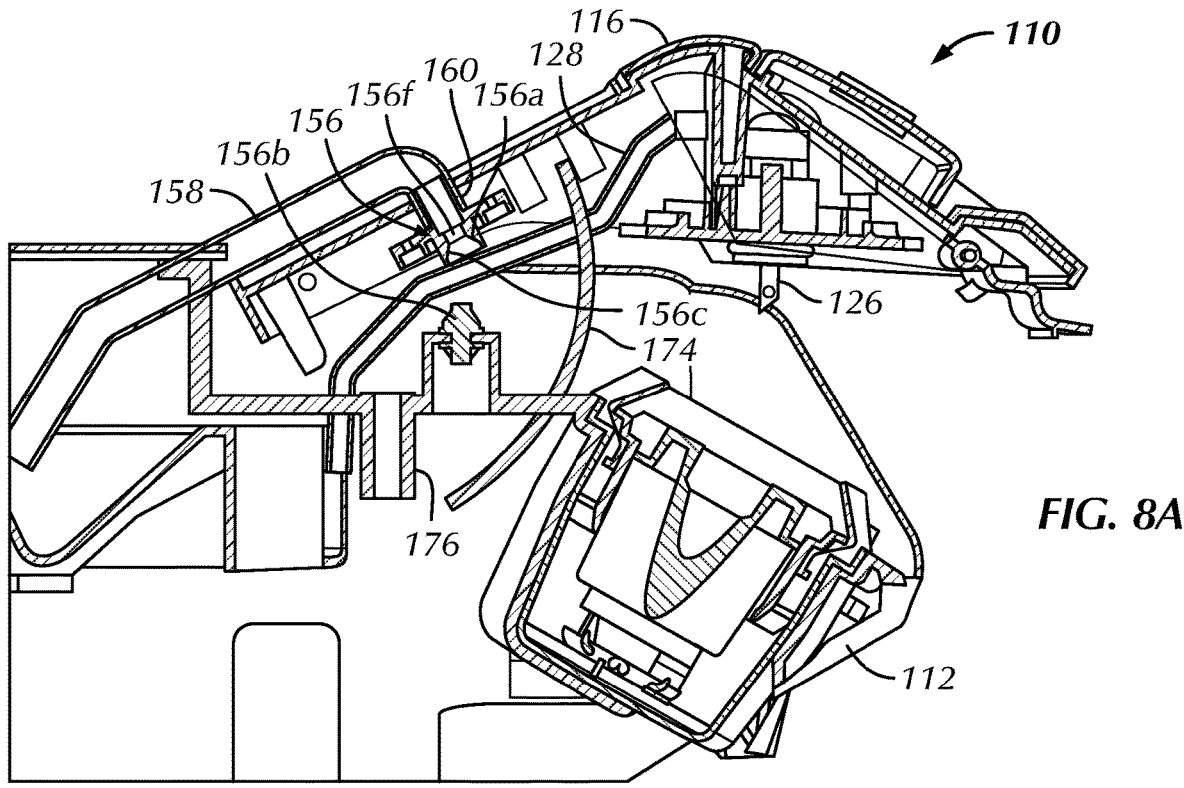
FIG. 8A is a partial, cross-sectional elevational view of an alternative embodiment of a pressure release valve in a beverage maker according to a second embodiment of the disclosure, with the cover in an open position.

As shown in FIGS. 8A-9B, the beverage maker 110, 110' includes a pressure release valve 156, 156' in fluid communication with at least the pump 32 and the HLG tank 20*a*, via a pressure release line 158. Referring to FIGS. 8A-8B, the pressure release valve 156 includes a generally cylindrical, hollow valve body 156*a* mounted to the cover 116 and a complementary valve stem 156*b* mounted to the body 112. The valve body 156*a* is attached to the first orifice 160 of the pressure release line 158 and includes an annular valve seat 156*c* projecting radially inwardly from the valve body 156*a*. The annular valve seat 156*c* includes a generally central aperture 156*f*. In the open position of the cover 116, i.e., partially or fully open, as shown in FIG. 8A, the valve body 156*a* and the valve stem 156*b* are physically disengaged from one another. Accordingly, the valve stem 156*b* is mechanically disengaged from the valve seat 156*c*, and pressure within the HLG tank 20*a* is released via the aperture 156*f*, thereby preventing discharge, or further discharge, of hot liquid from the discharge port 126.

Figure 8B:
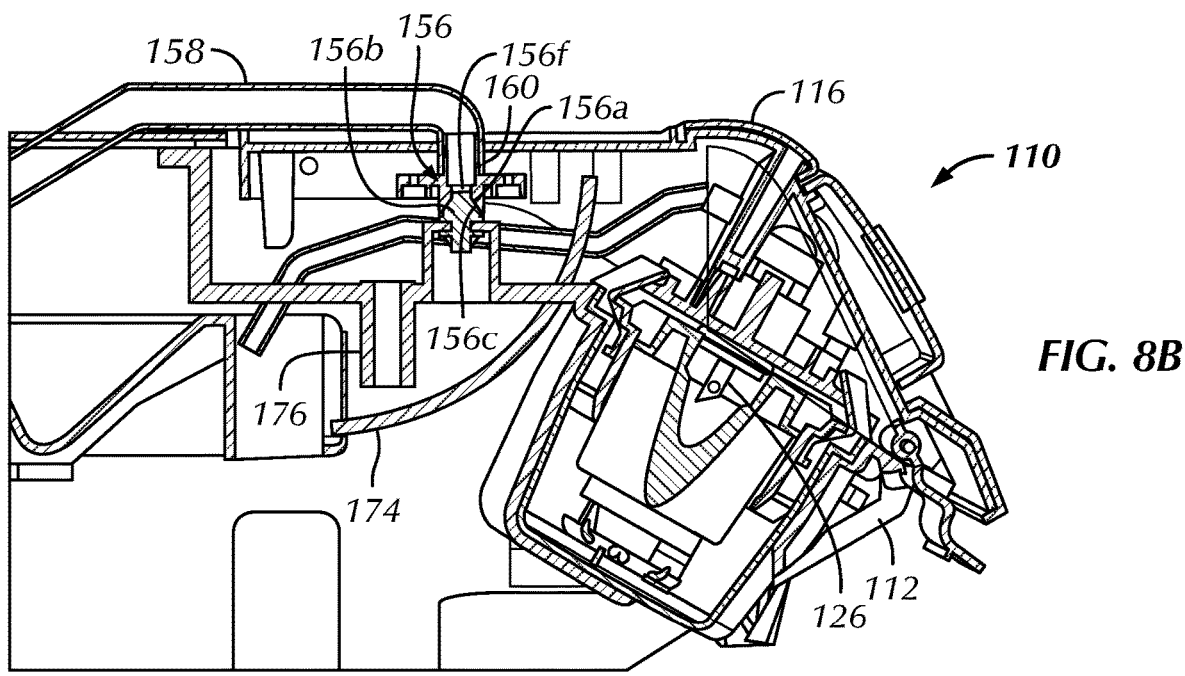
FIG. 8B is a partial, cross-sectional elevational view of the beverage maker of FIG. 8A, with the cover in a closed position.

Conversely, as shown in FIG. 8B, the valve stem 156*b* mounted on the body 112 sealingly engages the valve seat 156*c* mounted to the cover 116 in the closed position of the cover 116, thereby preventing release of pressure within the HLG tank 20*a* through the aperture 156*f*. Accordingly, pressure is capable of building up in the HLG tank 20*a* for discharge of hot liquid via the discharge port 126, as explained above in the embodiment of the beverage maker 10.

Figure 9A:
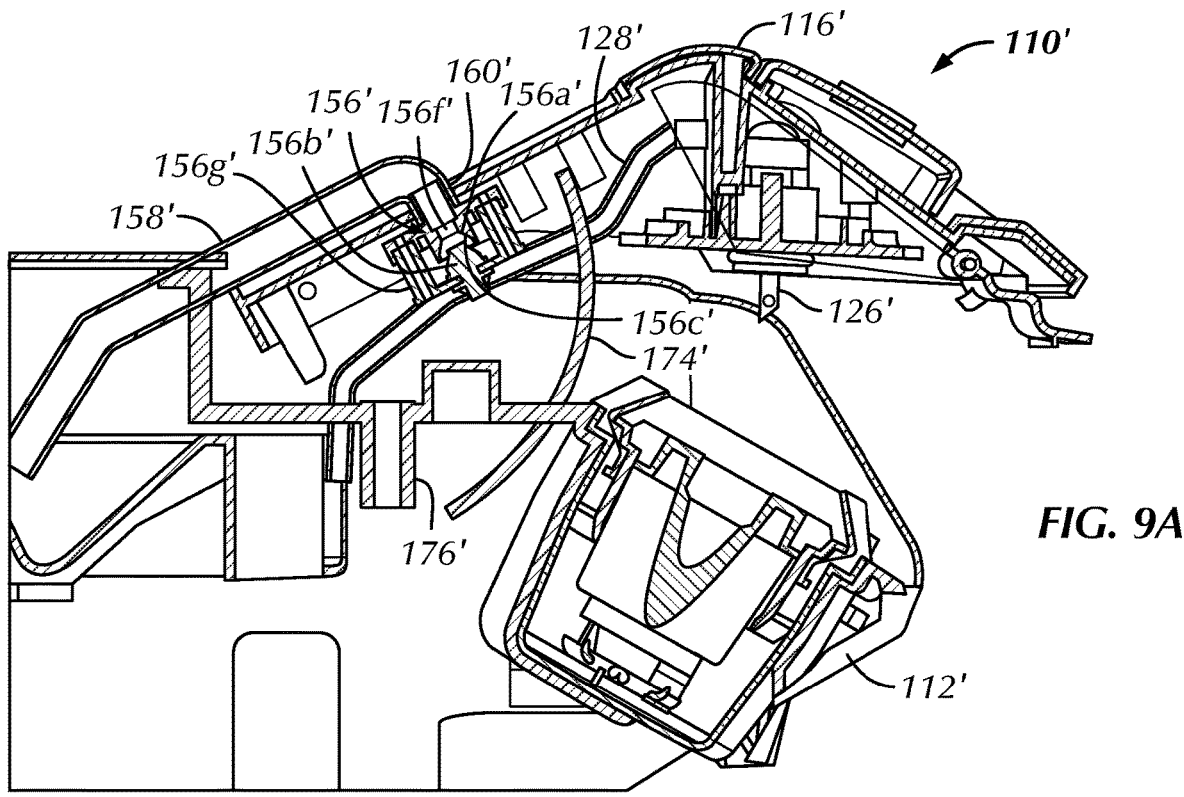
FIG. 9A is a partial, cross-sectional elevational view of another alternative embodiment of a pressure release valve in the beverage maker of FIG. 8A, with the cover in an open position.
Figure 9B:
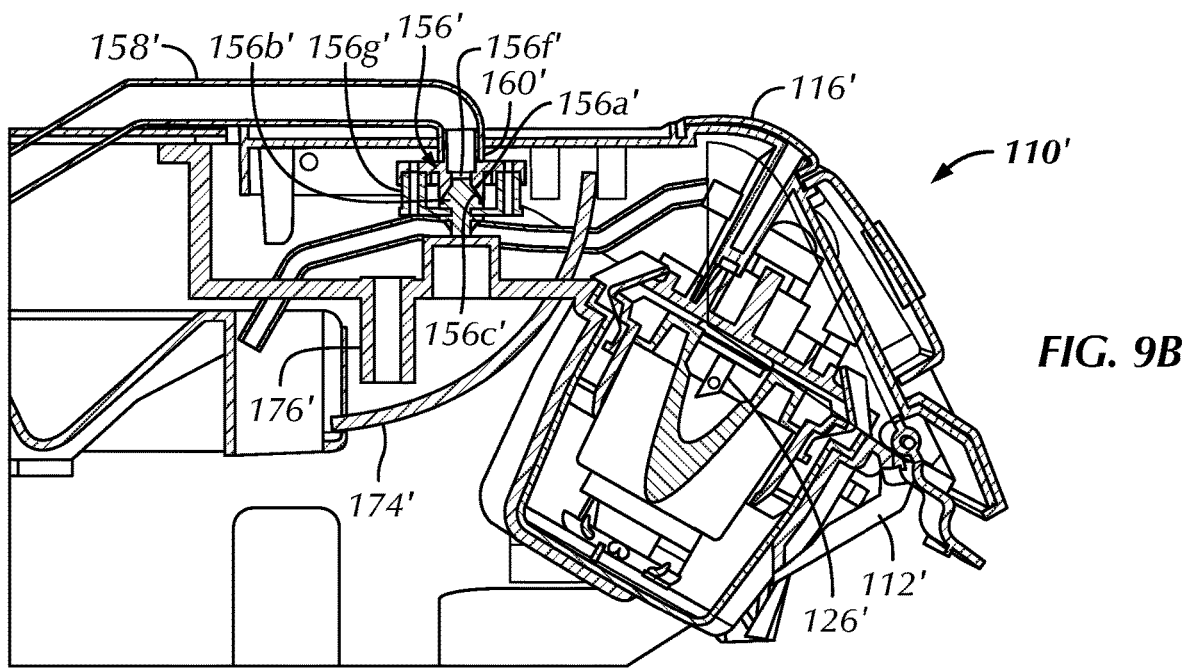
FIG. 9B is a partial, cross-sectional elevational view of the pressure release valve of FIG. 9A in the beverage maker of FIG. 8A, with the cover in a closed position.

Referring to FIGS. 9A-9B, the beverage maker 110' may alternatively include a pressure release valve 156' mounted to the cover 116. Similarly to the valve 156, the valve 156' includes a valve body 156*a*' having a valve seat 156*c*' projecting radially inwardly therefrom and including a generally central aperture 156*f*. The valve stem 156*b*', e.g., a generally elastic valve stem, is flexibly attached to the valve body 156*a*' via a connecting member 156*g*'. The valve stem 156*b*' is spaced from the valve seat 156*c*' in a normal, unactuated position thereof, thereby permitting release of pressure within the HLG tank 20*a* from the aperture 156*f* through the space between the aperture 156*f* and the valve steam 156*b*'. Accordingly, when the cover 116 is in an open position, i.e., partially or fully open, the valve stem 156*b*' is disengaged from the valve seat 156*c*' and pressure does not build up sufficiently in the HLG tank 20*a* to discharge liquid via the discharge port 126' (but rather is released from the valve 156').

The valve stem 156*b*' remains disengaged from the valve seat 156*c*' unless mechanically actuated into sealing engagement therewith in the closed position of the cover 116'. As shown in FIG. 9B, a surface of the body 112' engages and mechanically actuates the elastic valve stem 156*b*' into sealing engagement with the valve seat 156*c*', in the closed position of the cover 116, thereby preventing release of pressure within the HLG tank 20*a* through the aperture 156*f*. During movement of the cover 116 from the closed position (FIG. 9B) to the open position (FIG. 9A), the elastic valve stem 156*b*' returns into normal disengagement from the valve seat 156*c*' once no longer contacted by the body 112'. As should be understood by those of ordinary skill in the art, however, the valve stem 156*b*' may be spaced from the valve seat 156*c*' via any of numerous different methods known in the art, such as for example via a spring or alternative biasing member capable of biasing the valve stem 156*b*' away from the valve seat 156*c*' when not actuated by the body 112'.

As shown in FIGS. 8A, 8B, the beverage maker 110 may also include a deflecting member 174 positioned between the pressure release valve 156 and the discharge port 126. In the illustrated embodiment, the deflecting member 174 is attached to the cover 116 and extends into the body 112. The deflecting member 174 advances further into the body 112 when the cover 116 is closed. Otherwise, the deflecting member 174 may be configured to fold or bend when the cover 116 is closed. As should be understood, however, the deflecting member 174 may alternatively be attached to the body 112, and extend to the cover 116. The deflecting member 174 is also positioned forward of an orifice 176 in the body 112, in fluid communication with a controlled area of the beverage maker 110, i.e., a location generally not accessible by, or substantially not directed toward, the consumer, such as, for example, without limitation, the interior of the body 112, the reservoir 18 or a drip tray (not shown).

In one embodiment, the pressure release valve 156 and the orifice 176 may be substantially enclosed by the cover 116, the body 112 and the deflecting ember 174. The deflecting member 174 assists in directing fluid released from the pressure release valve 156 toward the orifice 176 thereby directing the fluid into the controlled area. As should be understood by those of ordinary skill in the art, although the deflecting member 174 is not shown in FIGS. 9A-9B, the deflecting member 174 is equally employable with the pressure release valve 156'.

Figure 10A:
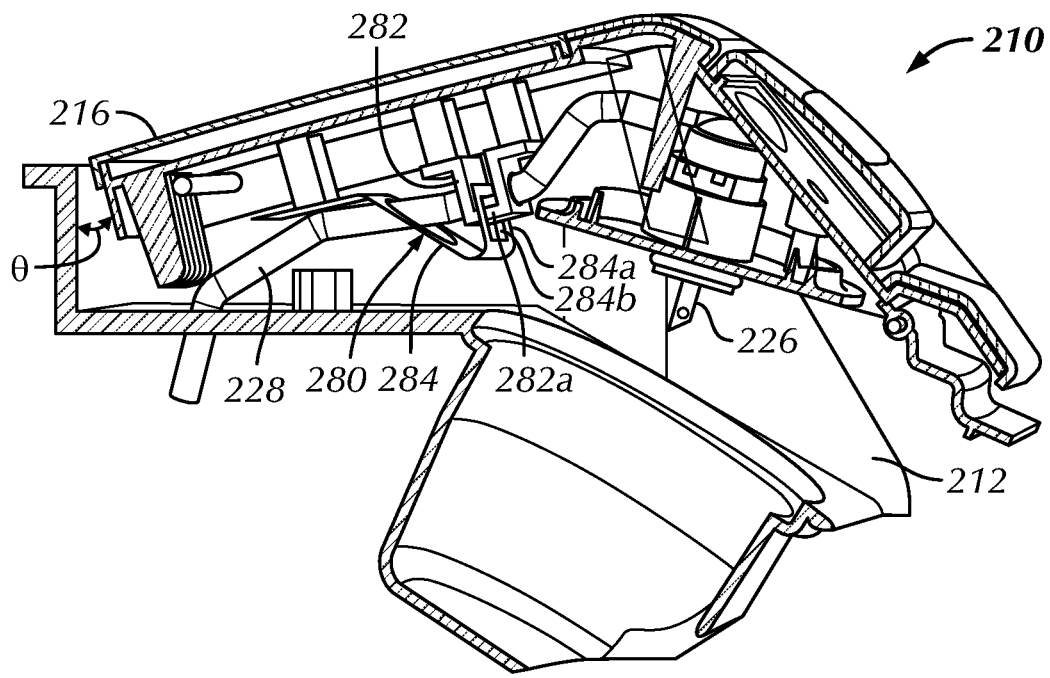
FIG. 10A is a partial, cross-sectional elevational view of a beverage maker according to a third embodiment of the disclosure, with the cover in an open position.
Figure 10B:
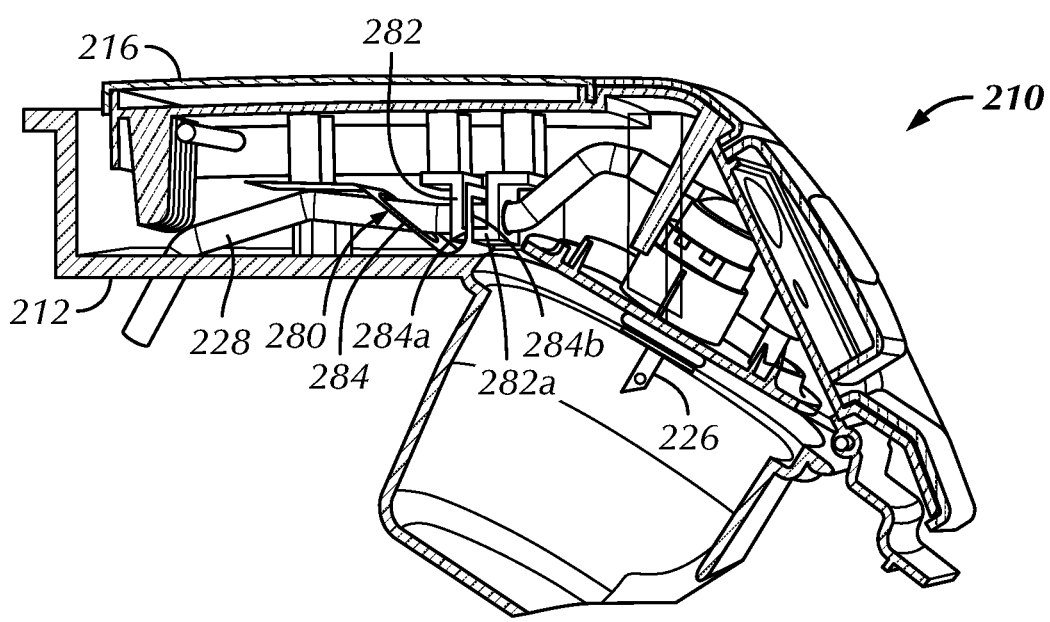
FIG. 10B is a partial, cross-sectional elevational view of the beverage maker of FIG. 10A, with the cover in a closed position.

FIGS. 10A-10B illustrate a third preferred embodiment of a beverage maker 210 of the present disclosure. The reference numerals of the present embodiment are distinguishable from those of the earlier embodiment(s) by a factor of two hundred (200), but otherwise indicate the same elements as indicated above, except as otherwise specified. Where a component of the beverage maker 210 is unchanged from the earlier embodiment(s) and is not shown in FIGS. 10A-10B, however, the reference numeral of the earlier embodiment(s) will be utilized.

The beverage maker 210 of the present embodiment is substantially similar to that of the earlier embodiment(s). While certain like reference numerals may be shown in FIGS. 10A-10B, the description of certain similarities between the embodiments may be omitted herein for the sake of brevity and convenience, and, therefore, is not limiting. A primary difference of the beverage maker 210 in comparison to the beverage makers 10, 110 is the inclusion of a pinch valve 280. Although a pressure release valve is not shown in FIGS. 10A-10B, it should be understood that the pinch valve 280 may equally be employed in conjunction with a pressure release valve, such as, for example, without limitation, any of the pressure release valve configurations described in the earlier embodiments.

As shown, the pinch valve 280 is mounted on the flexible discharge tube 228, which fluidly connects the outlet 20c of the HLG tank 20a with the discharge port 226. In the illustrated embodiment of FIGS. 10A-10B, the pinch valve 280 is also securely attached to the cover 216. However, as should be understood by those of ordinary skill in the art, the pinch valve 280 may alternatively be attached to any portion on the body 212, or within the body 212, permitting the pinch valve 280 to perform the functions described herein.

In the illustrated embodiment, the pinch valve 280 includes a supporting member 282 securely attached to the cover 216. A section of the flexible discharge tube 228 extends through, and is supported by, the supporting member 282. The pinch valve 280 further includes a biasing member 284 operatively connected with the supporting member 282. In the illustrated embodiment, the biasing member 284 is a generally cantilever type spring, fixed at one end thereof to the cover 216. The spring 284 includes a clip 284a at an opposing end thereof, defining an aperture 284b. The aperture 284b encloses a cross-section of the flexible discharge tube 228 and a base portion 282a of the supporting member 282, thereby bounding the cross-section of the discharge tube 228 between the clip 284a and the base portion 282a of the supporting member 282. As should be understood by those of ordinary skill in the art, any biasing member currently known or that later becomes known, capable of performing the functions of the biasing member 284 described herein may alternatively be utilized. Similarly, alternative pinch valves capable of performing the functions of the pinch valve 280 described herein may alternatively be utilized.

As shown in FIG. 10A, the biasing member 284, i.e., the cantilever spring, is configured to be oriented/bent into a natural pinching position, wherein the clip 284a exerts a downward force onto the cross-section of the discharge tube 228 within the aperture 284b, thereby pinching the cross-section against the base portion 282a of the supporting member 282. Accordingly, the clip 284a pinches the discharge tube 228, thereby substantially occluding the discharge tube 228 and, in turn, substantially obstructing fluid flow from the HLG outlet 20c to the discharge port 226. In the illustrated embodiment, the cantilever spring may be constructed of spring steel, having high yield stress, thereby being capable of both maintaining the pinching position and returning to the pinching position after being actuated away from such position (as disclosed below). The biasing member 284 may also be constructed of alternative materials having similar properties.

As shown in FIG. 10B, when the cover 216 is in a closed position, a portion, e.g., a surface, of the body 212 mechanically engages and actuates the spring 284 into a release position. That is, as the cover 216 is moved toward the body 212, the spring 284, including the clip 284a, is moved upwards upon contact with the body 212, overcoming the natural downward force of the clip 284a. In the release position of the spring 282, the cross-section of the discharge tube 228 within the aperture 284b is substantially not pinched or occluded, thereby permitting fluid flow from the HLG outlet 20c to the discharge port 226. Otherwise, when the cover 216 is in the open position, or is moved into the open position, the spring 284 returns into the pinching position, substantially occluding fluid flow.

As explained above, the cover 216 is movably, i.e., pivotably, engaged with the body 212. The cover 216 forms a pivot angle $\theta$ of approximately $0°$ with the body 212 in the closed positioned thereof, and forms at least an acute pivot angle $\theta$ with the body 212 in the open position thereof. The cover 216 may define, for example, an obtuse pivot angle $\theta$ of approximately $110°$ in the open position thereof. In one embodiment, the pinch valve 280 is positioned such that the biasing member 284 is disengaged from the body 212 at approximately a $15°$ pivot angle $\theta$ between the cover 216 and the body 212. That is, when the cover 216 is pivoted approximately $15°$ away from the closed position thereof ($0°$ pivot angle $\theta$), the biasing member 284 returns into the pinching position, substantially occluding fluid flow. Accordingly, fluid flow is prevented from reaching the discharge port 226 once the cover 216 is pivoted $15°$ away from the closed position, where the discharge port 226 is not yet directed in the direction of the user.

As should be understood by those of ordinary skill in the art, the distance between the pivot point of the cover 216 and the pinch valve 280 is a factor in determining the pivot angle $\theta$ at which the biasing member 284 is disengaged from the body 212. The further the pinch valve 280 is distanced from the pivot point, the shallower the pivot angle $\theta$ at which the biasing member 284 is disengaged from the body 212. Accordingly, the pinch valve 280 may be relocated as necessary in order to achieve the desired pivot angle $\theta$ at which the biasing member 284 is disengaged from the body 212, in order to return to the pinching position thereof.

FIGS. 11A-13B illustrate a fourth preferred embodiment of a beverage maker 310 of the present disclosure. The reference numerals of the present embodiment are distinguishable from those of the earlier embodiment(s) by a factor of three hundred (300), but otherwise indicate the same elements as indicated above, except as otherwise specified. Where a component of the beverage maker 310 is unchanged from the earlier embodiment(s) and is not shown in FIGS. 11A-11D, however, the reference numeral of the earlier embodiment(s) will be utilized.

The beverage maker 310 of the present embodiment is substantially similar to that of the earlier embodiment(s). While certain like reference numerals may be shown in FIGS. 11A-13B, the description of certain similarities between the embodiments may be omitted herein for the sake of brevity and convenience, and, therefore, is not limiting. A primary difference of the beverage maker 310 in comparison to the beverage makers 10, 110, 210 is the inclusion of a diverter valve 386.

The diverter valve 386 includes an inlet 386a in fluid communication with the HLG outlet 20c, a first outlet 386b in fluid communication with the discharge port 326, and a second outlet 386c in fluid communication with a separate bypass port 386d. A sealing member 388 (FIGS. 11B, 12B, 13B) is positioned within the diverter valve 386 and is movable, e.g., pivotable, between a bypass position (FIGS. 12B, 13B), sealingly engaging the first outlet 386b, and a discharge position (FIG. 11B), sealingly engaging the second outlet 386c.

As will be described further below, the sealing member 388 is mechanically linked to the cover 316, such that the sealing member 388 is oriented in the discharge position in the closed position of the cover 316, and oriented in the bypass position in the open position of the cover 316. In the discharge position (FIGS. 11A, 11B), the diverter valve inlet 386a is in fluid communication with the diverter valve first outlet 386b (the second outlet 386c being sealed off by the sealing member 388). Accordingly, in the discharge position of the sealing member 388, the HLG tank 20a is in fluid communication with the discharge port 326, and therefore, fluid is able to be discharged therethrough. Conversely, in the bypass position (FIGS. 12A-13B), the diverter valve inlet 386a is in fluid communication with the diverter valve second outlet 386c (the first outlet 386b being sealed off by the sealing member 388). Accordingly, in the bypass position of the sealing member 388, the HLG tank 20a is in fluid communication with the separate bypass port 386d. The separate bypass port 386d is fluidly communicated with a designated bypass location, such as, for example, without limitation, the reservoir 18, a drip tray (not shown), or an alternatively designated waste depository (not shown).

In the illustrated embodiment, the sealing member 388 is mechanically linked to the cover 316 via an over-the-center linkage 390. As should be understood, however, the sealing member 388 may be mechanically linked to the cover 316 via any of numerous different linkages, cams, gears or the like, currently known, or that later become known, capable of performing the mechanical linkage and accompanying rotation of the sealing member 388 between the discharge and bypass positions thereof, as explained in detail below.

Figure 11A:
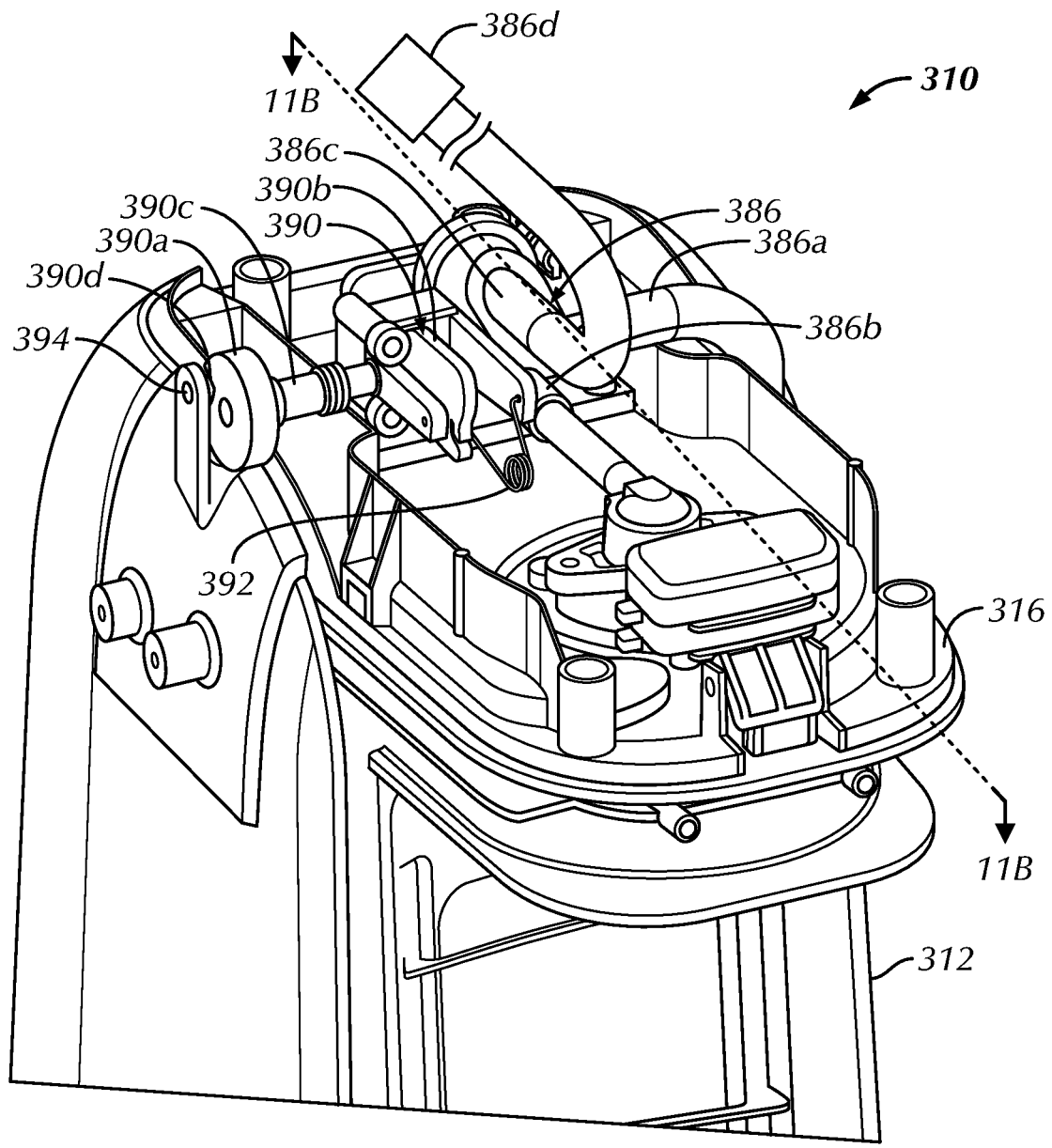
FIG. 11A is a top perspective view of a beverage maker according to a fourth embodiment of the disclosure, with the cover in a closed position.
Figure 11B:
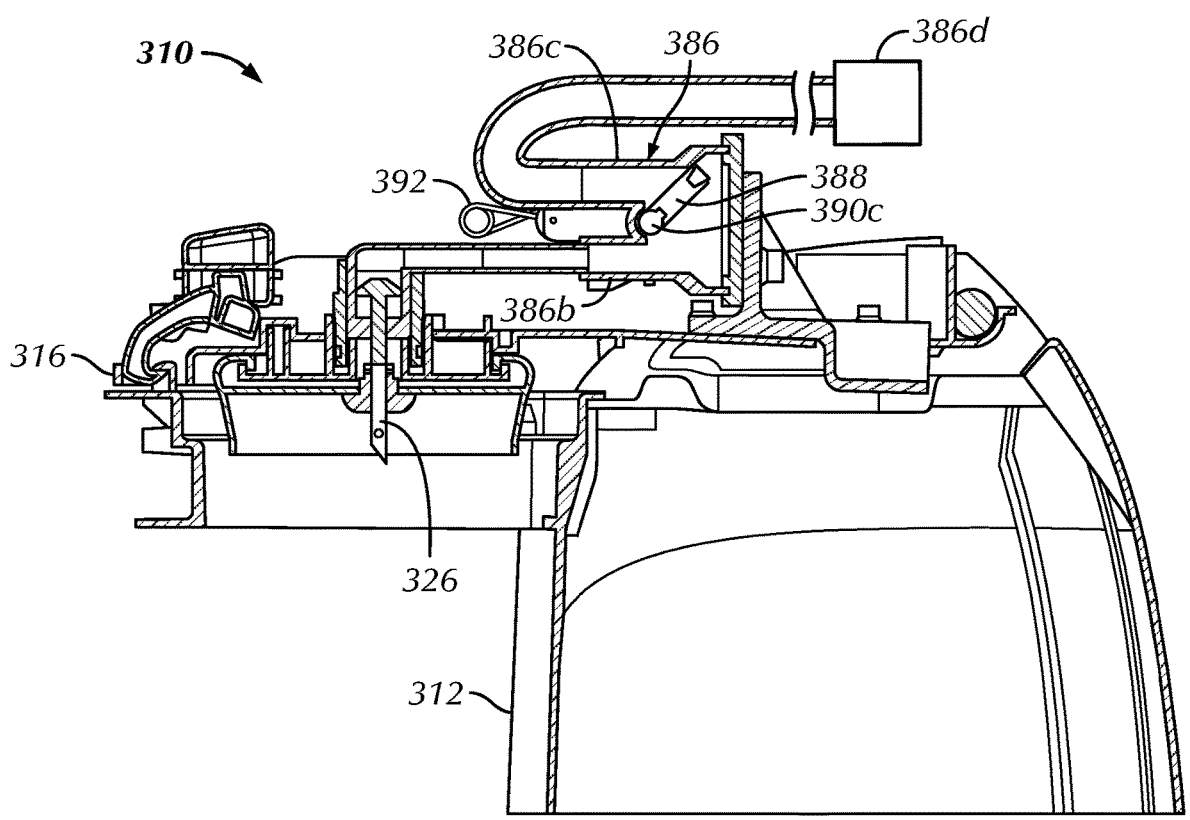
FIG. 11B, is a partial cross-sectional elevational view of the beverage maker of FIG. 11A, taken along sectional line 11B-11B, with the cover in the closed position.
Figure 12A:
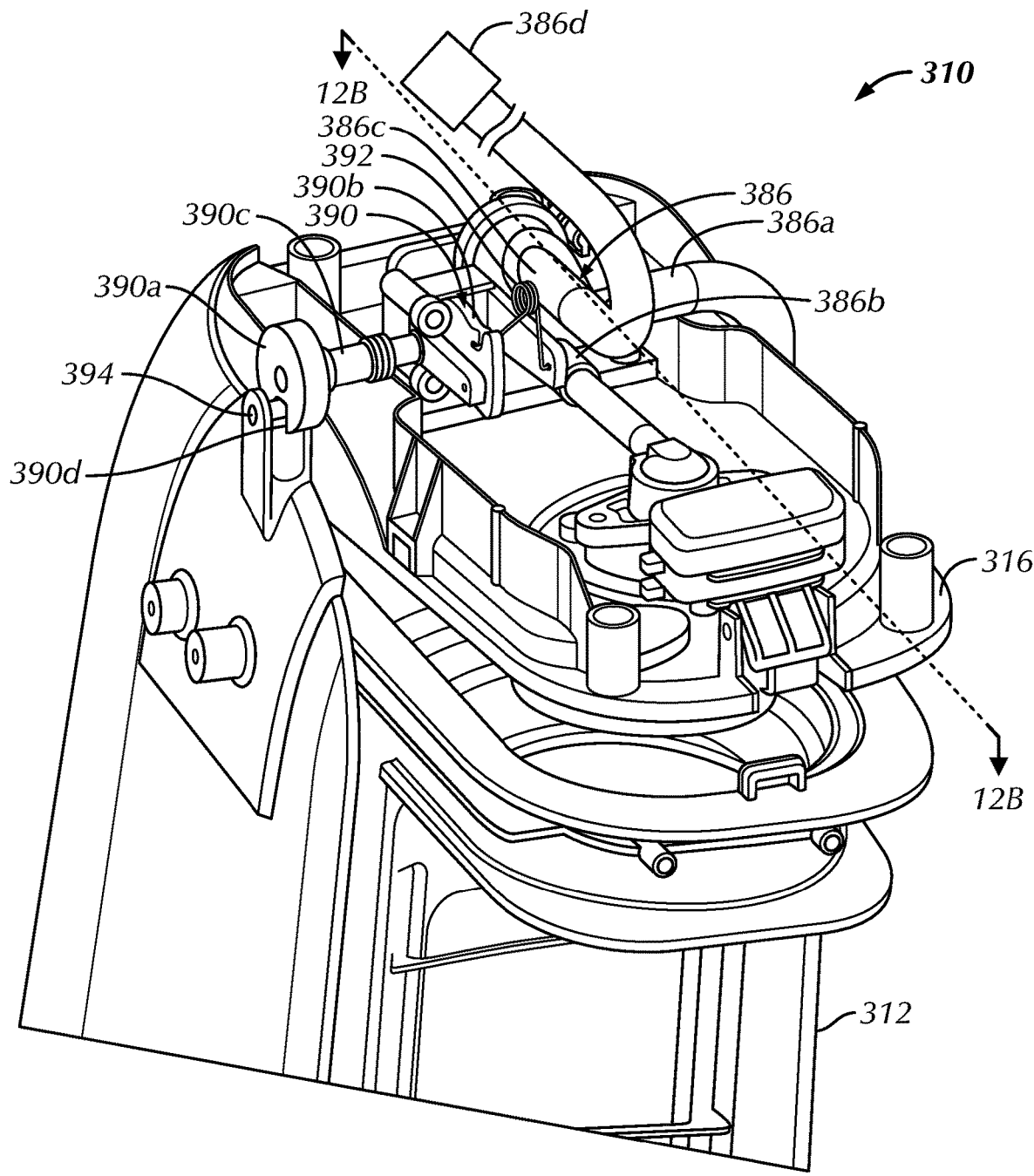
FIG. 12A is a top perspective view of the beverage maker of FIG. 11A, with the cover in a partially open position.
Figure 13A:
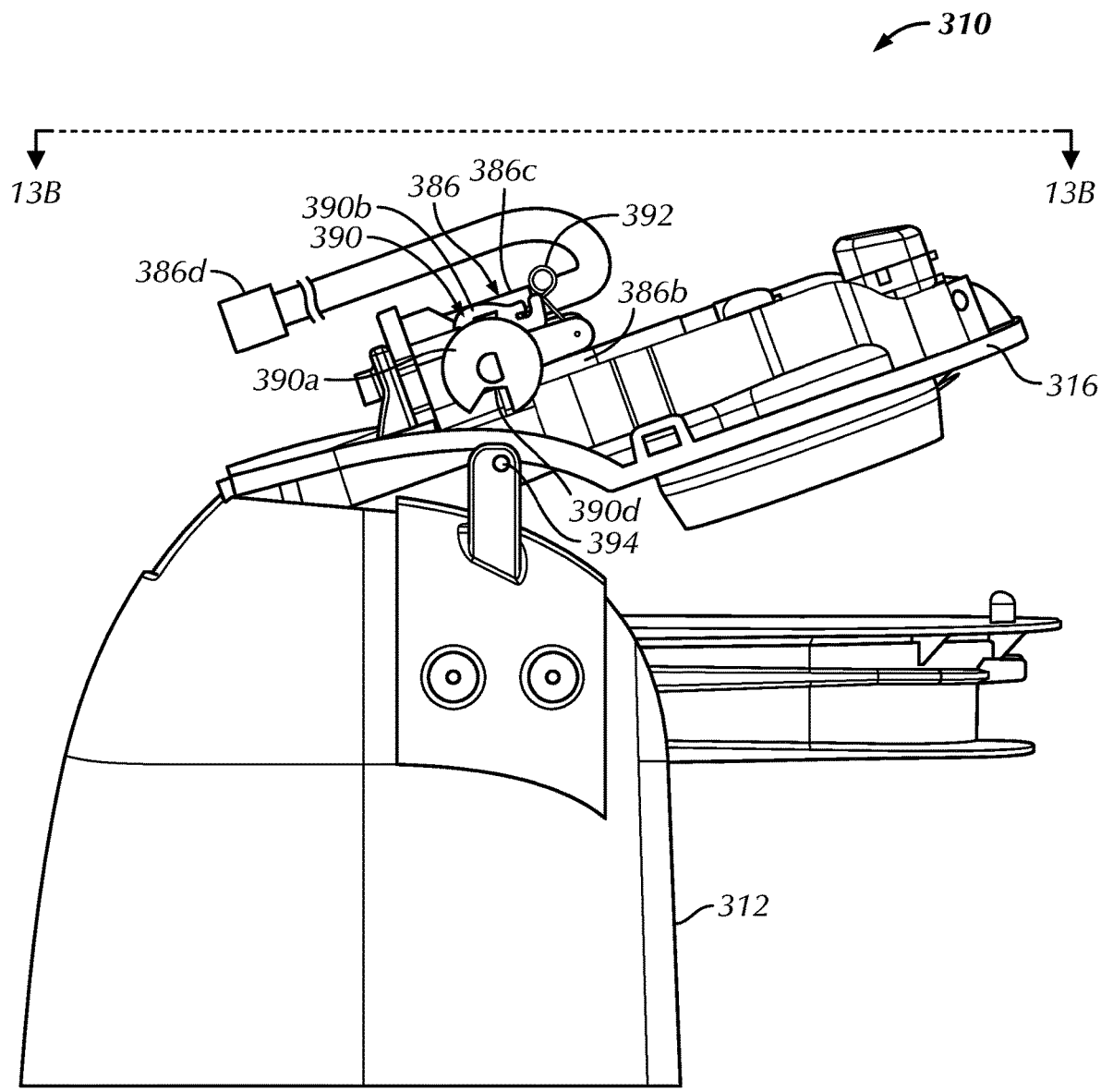
FIG. 13A is a side elevational view of the beverage maker of FIG. 11A, with the cover in a further open position.

Referring to FIGS. 11A, 12A and 13A, the over-the-center linkage 390 includes a latch pawl 390a and a cam member 390b spaced therefrom. The latch pawl 390a, the cam member 390b and the sealing member 388 are each rotatably securely attached to an elongate bar 390c extending therethrough. Accordingly, rotation of any one of the latch pawl 390a, the cam member 390b and the sealing member 388, about the central axis of the elongate bar 390c, rotates the other two as well. An over-the-center spring 392 is attached at one end thereof to the diverter valve 386 and at an opposing end thereof to the cam member 390b.

Figure 12B:
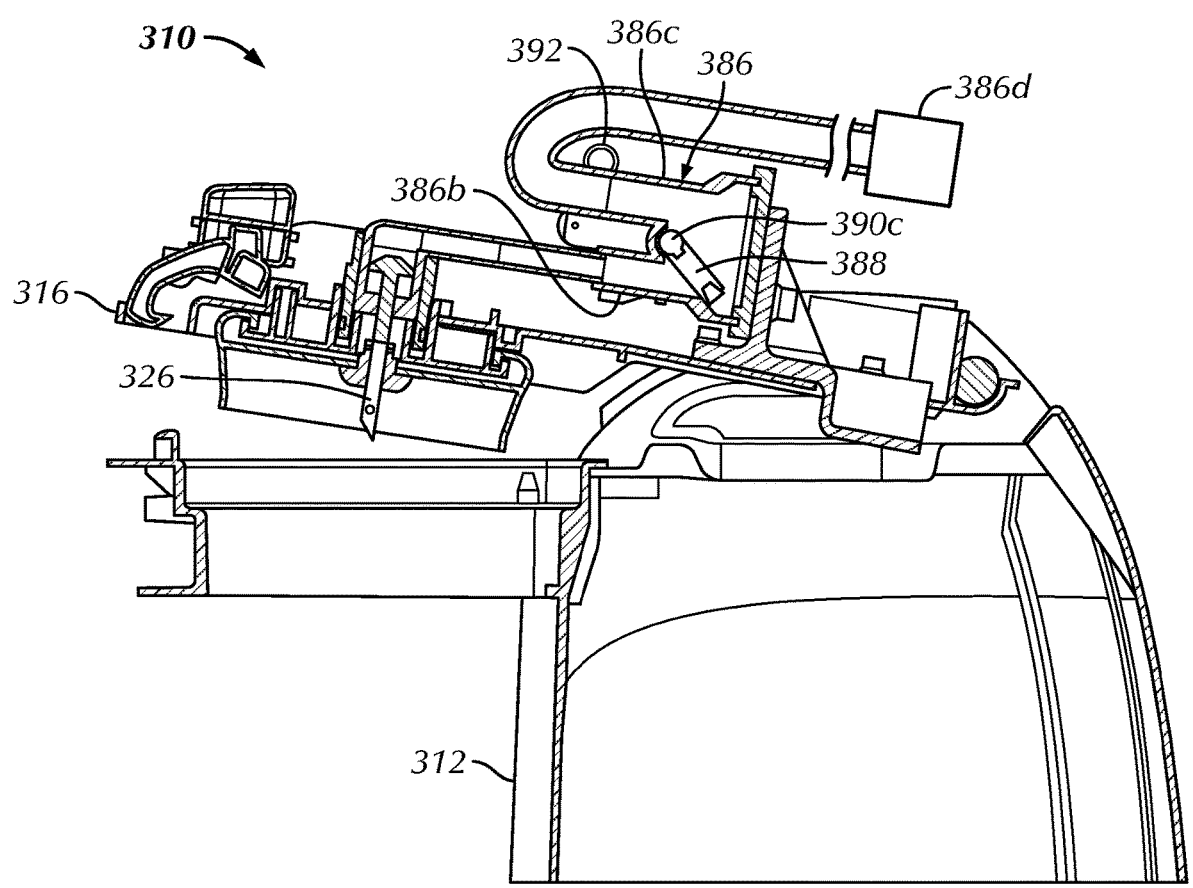
FIG. 12B is a partial cross-sectional elevational view of the beverage maker of FIG. 11A, taken along sectional line 12B-12B, with the cover in the partially open position.
Figure 13B:
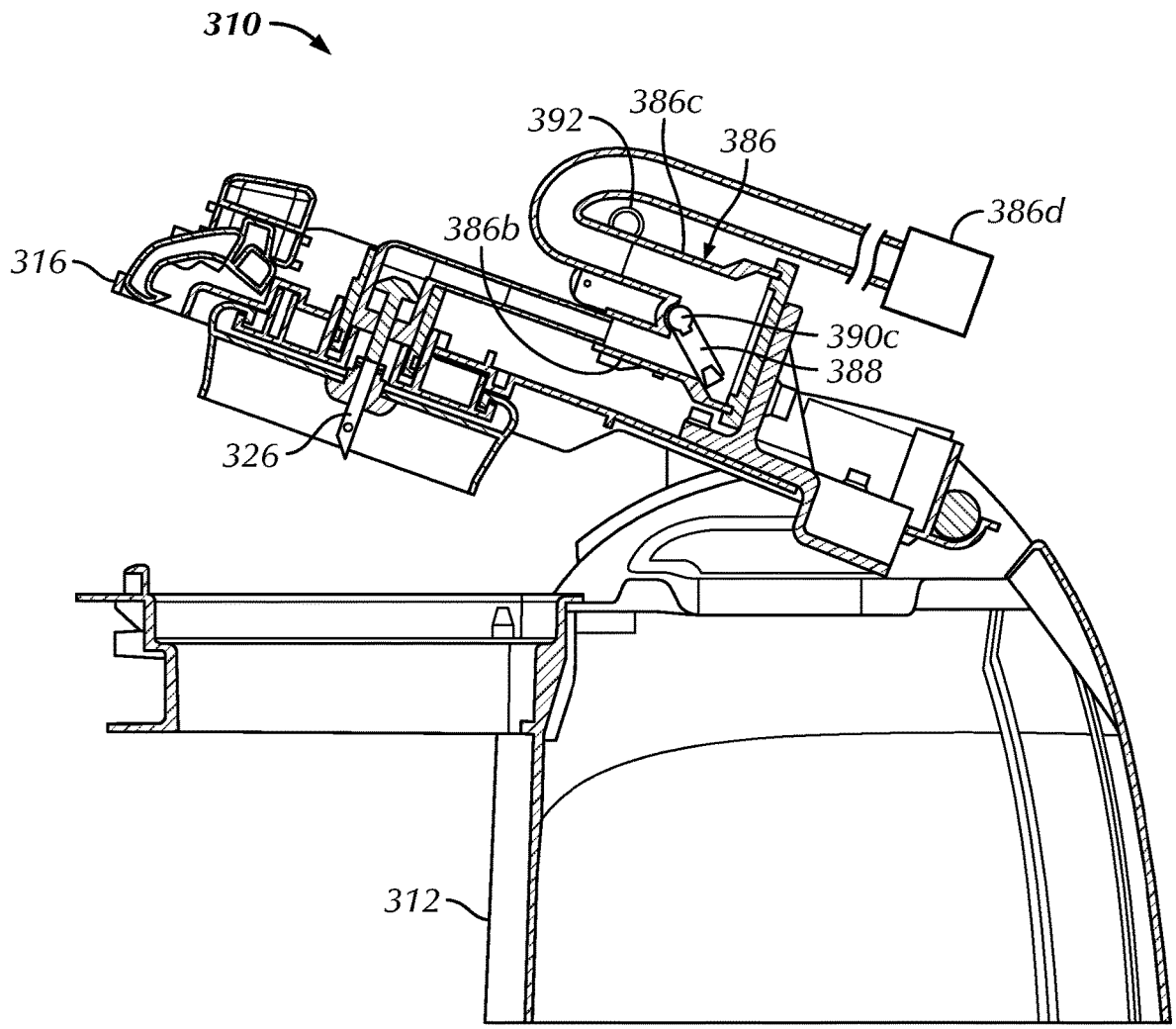
FIG. 13B is a partial cross-sectional elevational view of the beverage maker of FIG. 11A, taken along sectional line 13B-13B, with the cover in the further open position.

As should be understood by those of ordinary skill in the art, the over-the-center spring 392 is configured to flip/snap between a first position (FIG. 11A) and a second position (FIG. 12A, 13A) at a critical, i.e., center, point. Initial rotation of the cam member 390b induces the over-center-spring 392 to reach the critical point thereof and snap/flip from one position to the other. Snapping/Flipping of the over-the-center spring 392 causes further rotation of the cam member 390b, and, therefore, the sealing member 388. The first position of the spring 392 (FIG. 11A) corresponds to the discharge position of the sealing member 388 (FIG. 11B), and rotation to the second position of the spring 392 (FIGS. 12A, 13A) rotates the sealing member 388 to the bypass position thereof (FIGS. 12B, 13B).

The latch pawl 390a includes a groove 390d engageable with a projection 394 protruding from the cover 316. The projection 394 is securely attached to the cover 316, and the latch pawl 390a is rotatable relative to the projection 394 as the cover 316 is moved between the open and closed positions thereof. In the closed position of the cover 316 (FIG. 11A), the projection 394 is received within the groove 390d of the latch pawl 390a. As the cover 316 is pivoted from the closed position toward the open position, the projection 394, engaged with the groove 390d of the latch pawl 390a, rotates the latch pawl 390a, about an axis parallel to the elongate bar 390c.

Therefore, the elongate bar 390c also rotates about the central axis thereof, thereby also rotating the cam member 390b and the sealing member 388. Movement of the cover from the closed position toward the open position also disengages the projection 394 from the groove 390d of the latch pawl 390a (FIG. 13A). Nonetheless, rotation of the cam member 390b prior to disengagement of the latch pawl 390a from the projection 394 induces the over-center-spring 392 to reach the "critical point" thereof and flip from the first position thereof to the second position thereof, thereby rotating the sealing member 388 from the discharge position to the bypass position. Thus, as the cover 316 is moved into the open position thereof, the diverter valve 386 is moved into the bypass position thereof. As should be understood, rotating the cover from the open position back to the closed position results in the reverse movements to rotate the sealing member 388 from the bypass position back to the discharge position.

As explained above, the cover 316 is movably, i.e., pivotably, engaged with the body 312. In one embodiment, the over-the-center spring 392 is oriented such that the "critical point" thereof corresponds to approximately a 15° pivot angle between the cover 316 and the body 312. Therefore, when the cover 316 is pivoted approximately 15° away from the closed position thereof the sealing member 388 is rotated from the discharging position to the bypassing position, thereby diverting flow to the bypass port 386d, rather than to the discharge port 326. Accordingly, fluid flow is prevented from reaching the discharge port 326 once the cover 216 is pivoted 15° away from the closed position, where the discharge port 326 is not yet directed in the direction of the user. As should be understood by those of ordinary skill in the art, however, the mechanical linkage between the sealing member 388 and the cover 316 may be altered such that the sealing member 388 switches between the bypass and discharge positions at a different angular position of the cover 316 relative to the body 312.

Another embodiment of a beverage maker, designated broadly at 410, is shown in FIGS. 14-18. The beverage maker 410 is similar to the beverage makers discussed above, with the exception of the valve arrangement employed to direct fluid from the HLG to either the discharge port 426 or the bypass port 428. The differences are described below.

Figure 14:
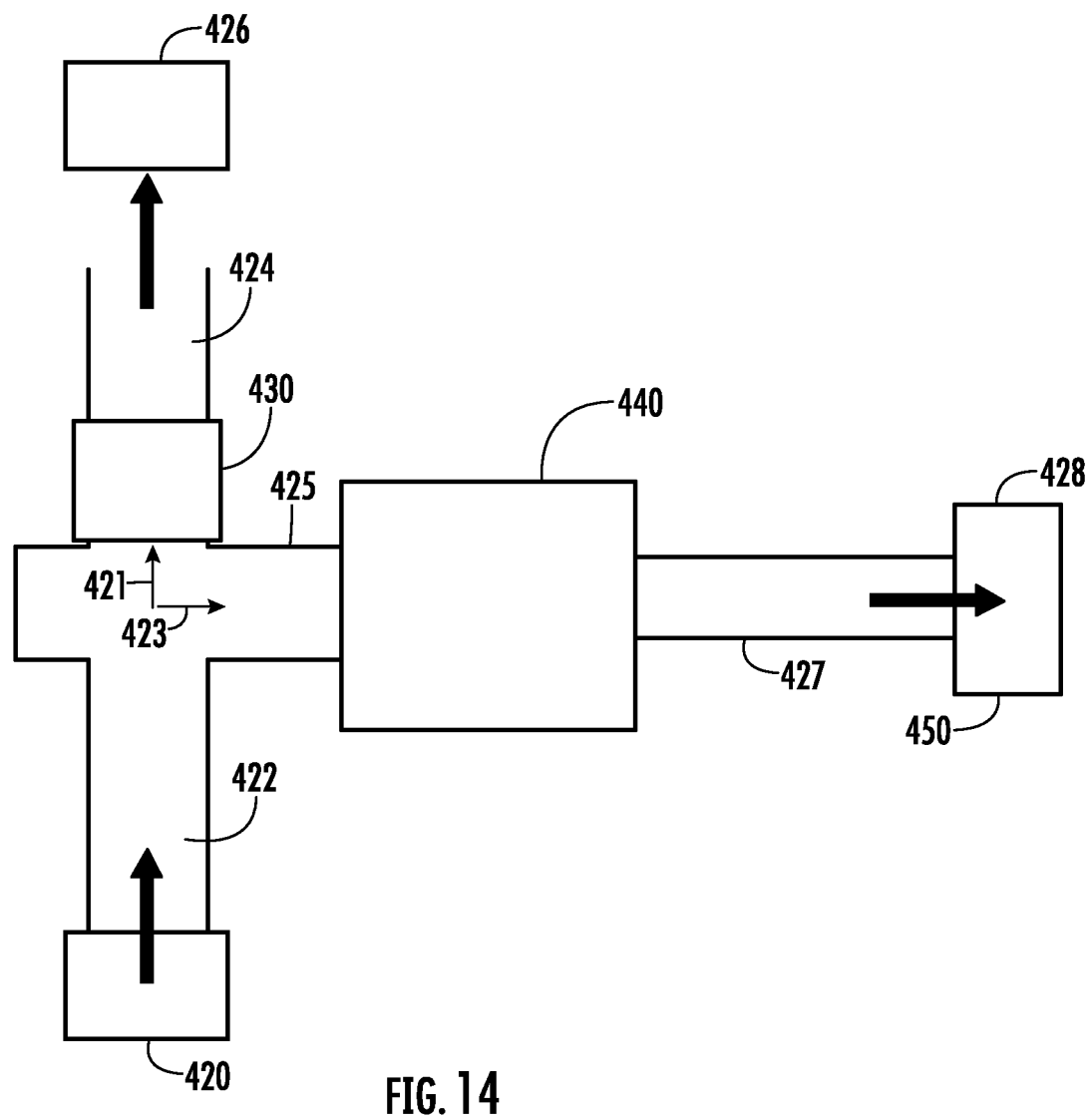
FIG. 14 is a schematic side view of a valve complex of a beverage maker according to further embodiments of the invention.

Referring to FIG. 14, the valve arrangement is illustrated schematically therein. A conduit 422 from the HLG 420 feeds to an intersection that has one branch 421 leading to a piston valve 430. A conduit 424 leads from the piston valve 430 to the discharge port 426. The piston valve 430 is operatively connected with the cover 416 of the beverage maker. Also, another branch 423 of the intersection leads to a short first bypass conduit segment 425 that leads in turn to a pressure relief valve (PRV) 440. A second bypass conduit segment 427 leads from the PRV 440 to the brew basket 450, which serves as the bypass port 428 (although in other embodiments the water tank may serve as the bypass port).

In operation, when the cover 416 is closed (e.g., when brewing is occurring), the piston 432 of the piston valve 430 (see FIG. 17) is positioned to allow fluid to flow from the HLG 420 through the piston valve 430 and the conduit 424 to the discharge port 426. Pivoting the cover 416 to its open position causes the piston 432 to move to block fluid flow through the piston valve 430 and into the conduit 424. Instead, fluid flows into the first bypass conduit segment 423 and ceases unless the pressure of the fluid exceeds the maximum pressure for the PRV 440, at which point the PRV 440 opens and permits fluid to flow through the PRV 440 and the second bypass conduit segment 427 and into the brew basket 450.

Figure 15:
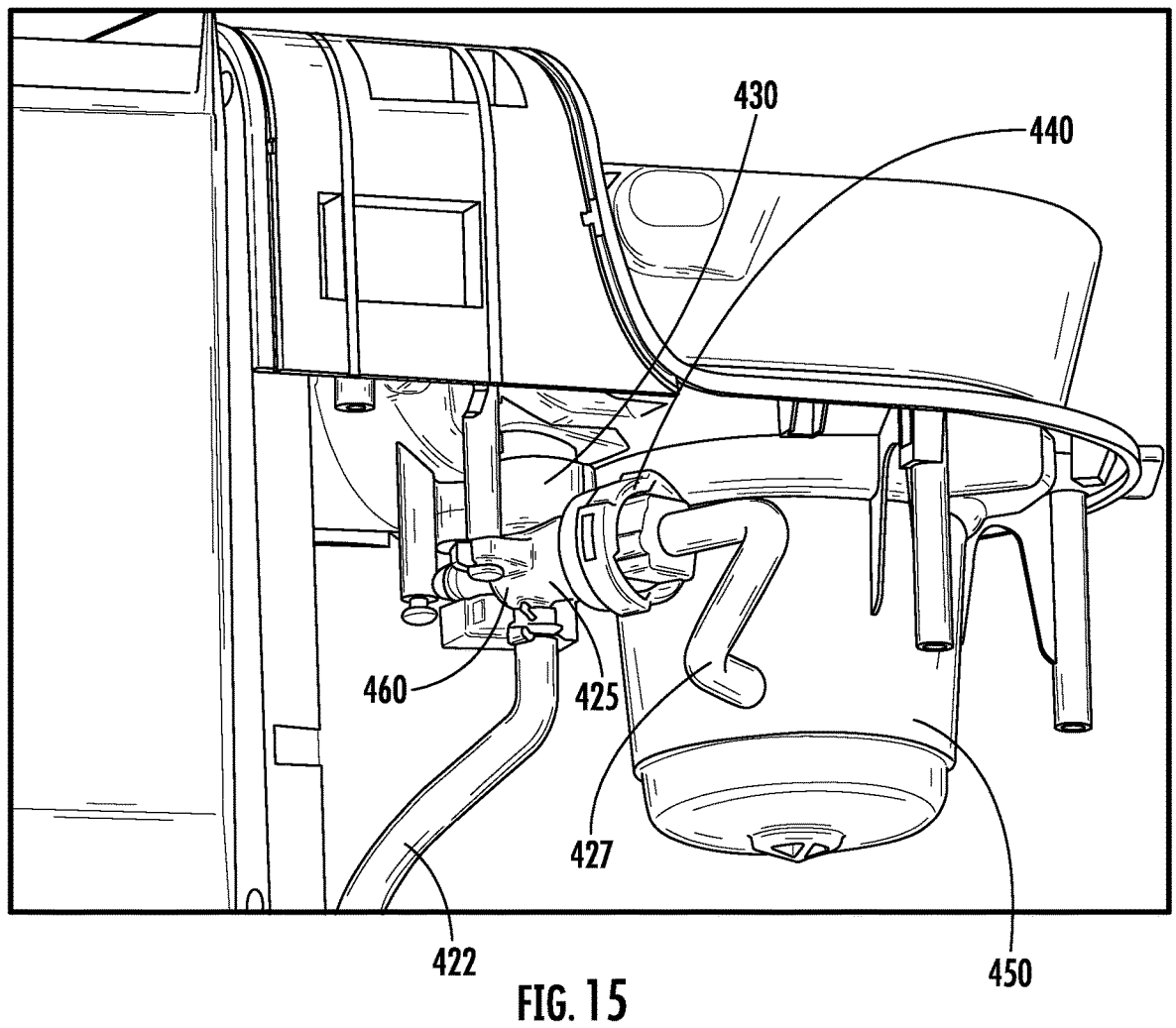
FIG. 15 is an internal bottom side perspective view of the valve complex of FIG. 14.
Figure 16:
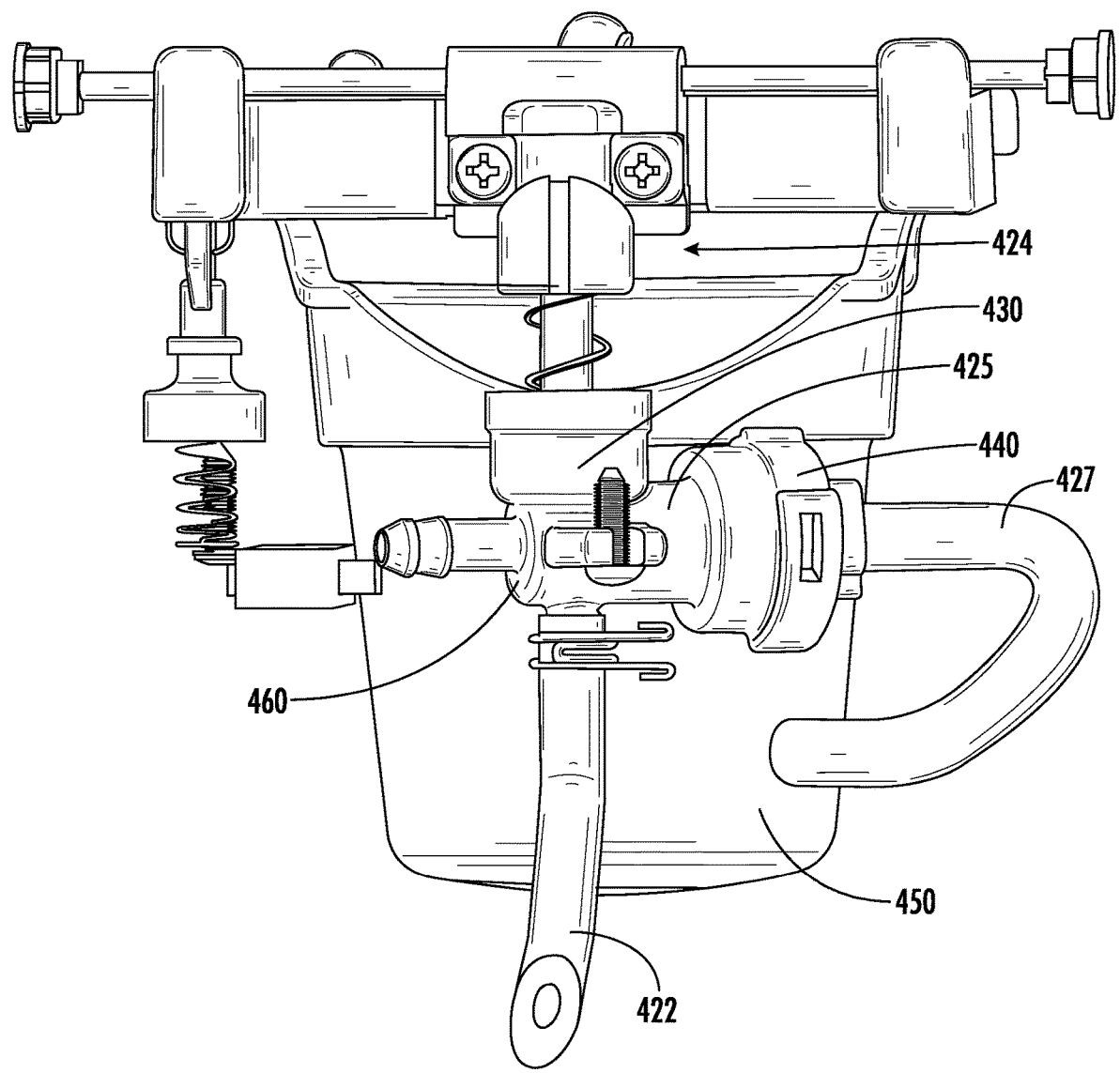
FIG. 16 is an internal bottom perspective view of the valve complex of FIG. 14.

The specific arrangement of the valve arrangement can be seen in FIGS. 15 and 16. As discussed above, the conduit 422 leads upwardly to the intersection of the piston valve 430 and the first bypass conduit segment 425 (in practice, the intersection is embodied in a fitting 460, which may also include the first bypass conduit segment 425). The piston valve 430 is positioned above the fitting 460. The conduit 424 is routed from the upper end of the piston valve 430 to the discharge port 426. The first bypass conduit segment 425 is routed from the fitting 460 generally perpendicularly to the piston valve 430 and feeds the PRV 440, which is located adjacent the fitting 460. The second bypass conduit segment 427 is routed generally horizontally and curves to enter the brew basket 450.

Figure 17:
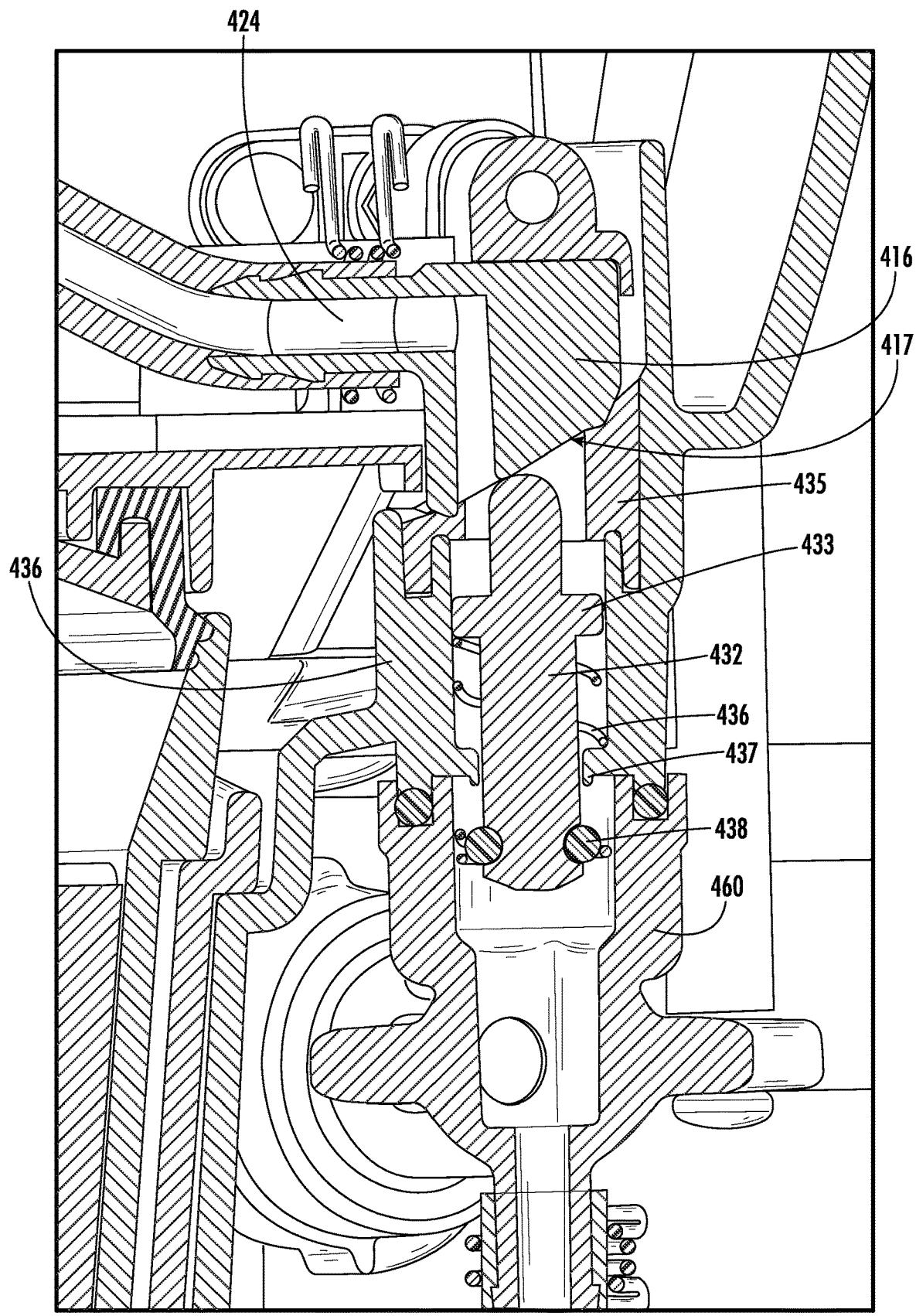
FIG. 17 is a section view of the valve complex of FIG. 14 showing the piston valve in the discharge position.
Figure 18:
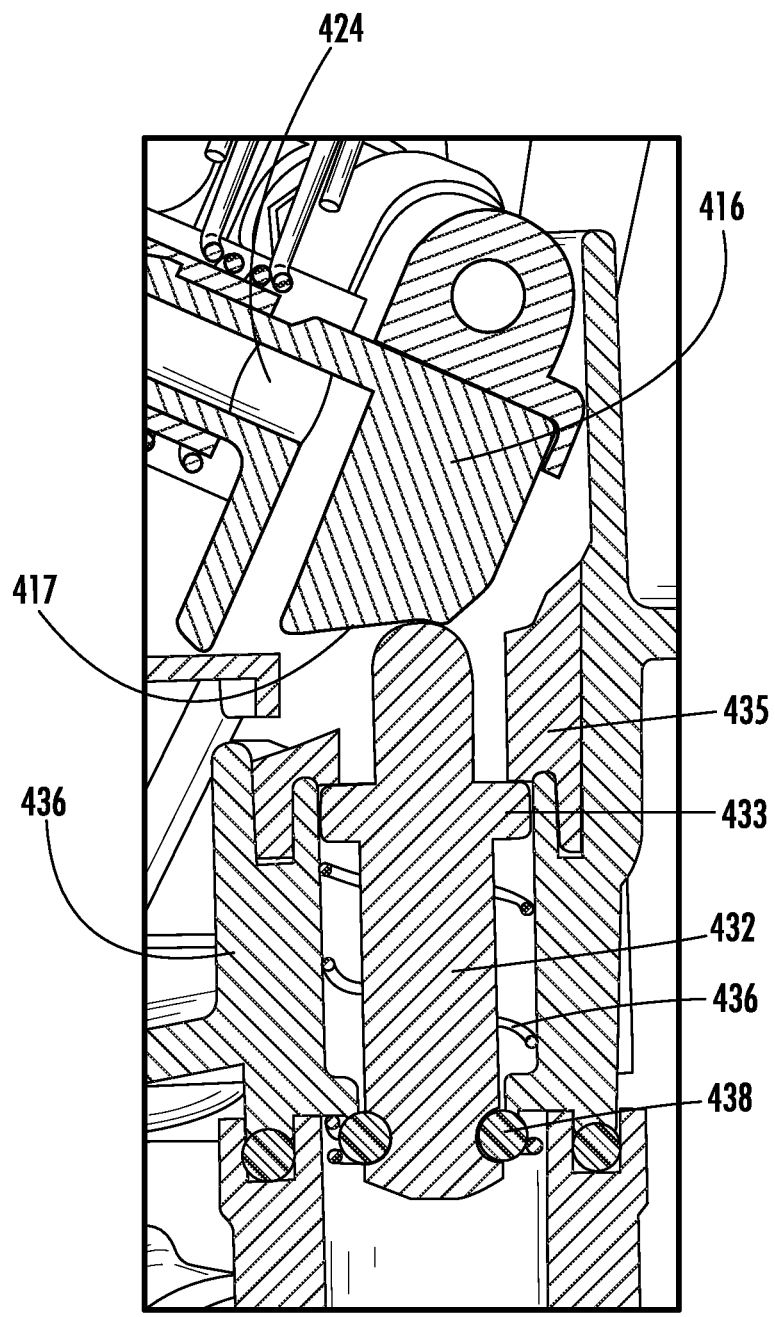
FIG. 18 is a section view of the valve complex of FIG. 14 showing the piston valve in the bypass position.

The structure and operation of the piston valve 430 can be seen in FIGS. 17 and 18. The piston valve 430 includes the aforementioned piston 432, a surrounding sleeve 434, and a helical spring 436 that encircles the piston 432 within the sleeve 434. The piston 432 includes a flange 433 that engages a shoulder 435 above the sleeve 434. The spring 436 extends between the flange 433 and a second shoulder 437 at the lower end of the sleeve. The spring 436 is in compression, thereby biasing the piston 432 upwardly. An O-ring 438 encircles the piston 432 near its lower end.

The piston valve 430 is illustrated in a discharge position in FIG. 17, wherein the piston 432 is lowered within the sleeve 434 by an inclined camming surface 417 that is connected with the cover 416 and that engages the upper end of the piston 432. Rotation of the cover 416 to the close position rotates the camming surface to engage and force the upper end of the piston 432 downwardly relative to the sleeve 434. Lowering of the piston 432 relative to the sleeve 434 separates the O-ring 438 from the lower surface of the shoulder 437, thereby enabling fluid to pass into and through the sleeve 434, and from there to the conduit 424 and the discharge port 426.

The piston valve 430 is illustrated in a bypass position in FIG. 18. When the cover 416 is pivoted to an open position, the camming surface 417 moves upwardly. The spring 436 forces the piston 432 upwardly relative to the sleeve 434, such that the O-ring 438 is drawn upwardly into the lower surface of the shoulder 437. This action seals the sleeve 434 from the cavity of the fitting 460, with the result that no fluid can pass into or past the sleeve 434. Consequently, fluid in the fitting 460 flows to the first bypass conduit segment 425 and the PRV 440. If the pressure in the fluid reaches or exceeds the threshold for the PRV 440 (e.g., between 1 to 20 psi, and more particularly between 2 and 5 psi), the PRV 440 opens and releases the fluid to the second bypass conduit segment 427, where it then flows to the brew basket 450.

Notably, the valve arrangement illustrated in FIGS. 14-18 and described herein is constructed so that the "default" condition of the piston valve 430 is closed (due to the biasing of the piston 432 toward its closed position). As a result, upon opening of the cover 416, the piston valve 430 immediately closes. This action minimizes the chance that any water may undesirably reach the discharge port 426 with the cover 416 open.

It will be appreciated by those skilled in the art that changes could be made to the embodiments described above without departing from the broad inventive concept thereof. For example, the beverage maker 10 may include a second reservoir for receiving and/or holding liquid to be used for preparing a beverage that in fluid communication with the reservoir and preferably selectively removable from the body. It is understood, therefore, that this disclosure is not limited to the particular embodiments disclosed, but it is intended to cover modifications within the spirit and scope of the present disclosure as defined by the appended claims.

We claim:
1. A beverage maker comprising:
a body;
a reservoir for receiving a liquid to be used for preparing a beverage;
a hot liquid generator (HLG) having an inlet, an outlet and a tank, the inlet of the HLG being connected to the reservoir for receiving liquid into the tank;
at least one heater in thermal communication with liquid in the HLG tank;
a discharge port in fluid communication with the outlet of the HLG;
a pump fluidly connected with the HLG tank for displacing liquid out of the tank outlet to the discharge port;
a controller configured to actuate the at least one heater and the pump;
a switch electrically coupled with the pump, the switch being biased into an "off" position, to maintain the pump in an inoperable condition, and being actuatable into an "on" position, placing the pump in an operational condition; and
a pressure release valve in fluid communication with at least the HLG tank, the pressure release valve being movable between an open position for releasing pressure within the tank therethrough and a closed position for preventing the release of pressure within the tank therethrough; and
a cover movably attached to an upper end of the body and being movable between an open position, and a closed position;
wherein the cover:
mechanically actuates the switch into the "on" position and mechanically actuates or releases the pressure release valve into one of the open and closed positions, upon movement of the cover to the closed position thereof, and
releases the switch for return into the "off" position and mechanically actuates or releases the pressure release valve into the other of the open and closed positions, upon movement of the cover from the closed position toward the open position.

2. The beverage maker of claim 1, wherein the cover mechanically actuates the pressure release valve into the closed position, upon movement to the closed position thereof, and releases the pressure release valve for return into the open position, upon movement of the cover from the closed position toward the open position.

3. The beverage maker of claim 2, further comprising a pump line fluidly connecting the pump with the HLG tank, the pump line having a first orifice, and the pressure release valve comprises a generally hollow dome-shaped elastic valve body defining a monolithic elastic spring and a generally central valve stem projecting through the valve body, wherein the first orifice defines a valve seat of the pressure release valve and is sized and shaped to sealingly receive the valve stem in the closed position of the pressure release valve.

4. The beverage maker of claim 3, wherein a base of the dome-shaped elastic valve body is spaced from the first orifice, and in the open position of the pressure release valve the valve stem is disengaged from the first orifice such that pressure within the tank is released via said space, and in the closed position of the pressure release valve the valve stem sealingly engages the first orifice.

5. The beverage maker of claim 4, wherein the elastic spring biases the valve stem away from the first orifice and the cover overcomes the bias of the elastic spring and mechanically moves the valve stem into sealing engagement with the first orifice for closing the pressure release valve.

6. The beverage maker of claim 1, wherein the cover mechanically actuates the pressure release valve into the open position upon movement of the cover from the closed position toward the open position, and mechanically releases the pressure release valve for return to the closed position, in the closed position of the cover.

7. The beverage maker of claim 6, wherein the pressure release valve comprises a generally cylindrical, hollow valve body, an annular valve seat projecting radially inwardly from the valve body, and having a generally central aperture, a valve stem projecting through the valve body, the valve seat, having an annular seal proximate a base end thereof, and a coil spring operatively connected between the valve body and the valve stem, the spring normally biasing the annular seal into sealing engagement with the valve seat.

8. The beverage maker of claim 7, wherein the cover engages the valve stem upon movement from the closed position toward the open position and moves the valve stem against the bias of the coil spring, thereby disengaging the annular seal from the valve seat and opening the pressure release valve.

9. The beverage maker of claim 1, wherein an overpressure tube extends from the HLG tank, having an overpressure valve biased into a closed position, the overpressure valve being configured to move into an open position at a predetermined internal pressure of the HLG tank, thereby allowing pressure to escape out of the HLG tank through the overpressure valve.

10. The beverage maker of claim 1, further comprising a vent tube extending from within the HLG tank to the reservoir, having a vent valve proximate the reservoir, wherein the vent valve is biased into an open position, such that air escapes from the HLG tank through the vent tube and vent valve as liquid is received into the HLG tank from the reservoir.

11. The beverage maker of claim 10, wherein the vent tube extends from proximate a base of the HLG tank, and includes a vent orifice proximate an upper end of the HLG tank having a diameter within the range of approximately 1.5 mm to approximately 2.5 mm.

12. The beverage maker of claim 10, wherein the vent tube extends proximate to an upper end of the reservoir and includes a viewing section within the reservoir having measured markings thereon for indicating a volume of liquid within the HLG tank, the beverage maker further comprising a floatation member located within the vent tube and a floatation stem projecting from the floatation member toward the reservoir, wherein liquid within the HLG tank raises the floatation member and an upper end of the floatation stem is visible through the viewing section of the vent tube, relative to the measured markings, thereby indicating a volume of liquid within the HLG tank.

13. The beverage maker of claim 1, further comprising a fill tube connecting the reservoir and the inlet of the HLG, and a metering valve in fluid communication between the reservoir and the fill tube, the metering valve including a metering stem projecting upwardly past an open upper end of the reservoir and having measured markings thereon for indicating a volume of liquid within the reservoir, the metering stem being biased into a closed position of the metering valve;
  wherein the cover mechanically actuates the metering stem into an open position of the metering valve upon movement of the cover to the closed position thereof, releasing liquid within the reservoir through the metering valve and into the fill tube, and the cover releases the metering stem for return into the closed position of the metering valve upon movement of the cover from the closed position toward the open position.

14. The beverage maker of claim 1, wherein the beverage maker further comprises a basket within the body having an open upper end for receiving loose foodstuff, the basket being in fluid communication with an outlet of the discharge port, and a basket cover attached to an inner side of the cover, the basket cover being located and shaped to sealingly engage the upper end of the basket when the cover is in the closed position, thereby preventing flow of the foodstuff or liquid out of the upper end of the basket.

15. The beverage maker of claim 1, wherein the switch is also electrically coupled to the controller, and the switch electrically disconnects the controller from the pump in the "off" position thereof, and electrically connects the controller with the pump in the "on" position thereof.

16. The beverage maker of claim 1, wherein the pressure release valve is attached to the body.

17. A beverage maker comprising:
  a body:
  a reservoir for receiving a liquid to be used for preparing a beverage;
  a hot liquid generator (HLG) having an inlet, an outlet and a tank, the inlet of the HLG being connected to the reservoir for receiving liquid into the tank;
  at least one heater in thermal communication with liquid in the HLG tank;
  a discharge port in fluid communication with the outlet of the HLG;
  a pump fluidly connected with the HLG tank for displacing liquid out of the tank outlet to the discharge port;
  a controller configured to actuate the at least one heater and the pump;
  a switch electrically coupled with the pump, the switch being biased into an "off" position, to maintain the pump in an inoperable condition, and being actuatable into an "on" position, placing the pump in an operational condition; and a pressure release valve in fluid communication with at least the HLG tank, the pressure release valve being movable between an open position for releasing pressure within the tank therethrough and a closed position for preventing the release of pressure within the tank therethrough; and a cover movably attached to an upper end of the body and being movable between an open position, and a closed position;

wherein movement of the cover mechanically actuates the switch into the "on" position and mechanically actuates or releases the pressure release valve into one of the open and closed positions, upon movement of the cover to the closed position thereof, and releases the switch for return into the "off" position and mechanically actuates or releases the pressure release valve into the other of the open and closed positions, upon movement of the cover from the closed position toward the open position.

18. The beverage maker of claim 17, wherein movement of the cover to the closed position causes the pressure release valve to move to its open position, and wherein movement of the cover to the closed position causes the pressure release valve to move to its closed position.

\* \* \* \* \*